(12) United States Patent
Hasegawa

(10) Patent No.: US 11,028,880 B2
(45) Date of Patent: Jun. 8, 2021

(54) ROLLING BEARING, ROLLING DEVICE, AND METHOD OF MANUFACTURING ROLLING DEVICE

(71) Applicant: NTN CORPORATION, Osaka (JP)

(72) Inventor: Naoya Hasegawa, Mie (JP)

(73) Assignee: NTN CORPORATION, Osaka (JP)

( * ) Notice: Subject to any disclaimer, the term of this patent is extended or adjusted under 35 U.S.C. 154(b) by 391 days.

(21) Appl. No.: 16/071,851

(22) PCT Filed: Jan. 5, 2017

(86) PCT No.: PCT/JP2017/000128
§ 371 (c)(1),
(2) Date: Jul. 20, 2018

(87) PCT Pub. No.: WO2017/126323
PCT Pub. Date: Jul. 27, 2017

(65) Prior Publication Data
US 2020/0400193 A1    Dec. 24, 2020

(30) Foreign Application Priority Data

Jan. 21, 2016 (JP) .............................. JP2016-009964
Feb. 25, 2016 (JP) .............................. JP2016-034480
Sep. 1, 2016 (JP) .............................. JP2016-170758

(51) Int. Cl.
*F16C 33/62* (2006.01)
*F16C 19/16* (2006.01)

(52) U.S. Cl.
CPC .............. *F16C 33/62* (2013.01); *F16C 19/16* (2013.01)

(58) Field of Classification Search
CPC .. F16C 19/26; F16C 19/36–364; F16C 33/32; F16C 33/34; F16C 33/62; F16C 33/64; F16C 2223/30; F16C 2240/54
See application file for complete search history.

(56) References Cited

U.S. PATENT DOCUMENTS 5,150,974 A * 9/1992 Tamada .................. F16C 33/62
                                                        384/463
5,641,038 A    6/1997 Akamatsu
(Continued)

FOREIGN PATENT DOCUMENTS

JP          04160225    *  6/1992
JP          H04-265480 A    9/1992
(Continued)

OTHER PUBLICATIONS

Translation of JP2006322017 obtained Oct. 26, 2020.*
(Continued)

*Primary Examiner* — James Pilkington
(74) *Attorney, Agent, or Firm* — McDermott Will & Emery LLP

(57) ABSTRACT

A rolling bearing, a rolling device, and a method of manufacturing the rolling device are provided, by which a long life can readily be implemented by suppressing surface damage even on the use condition that the oil film formation performance of a rolling part is poor. A rolling device includes: a first rolling component made of SUJ2; and a second rolling component made of SUJ2 and configured to contact the first rolling component. A surface of a rolling part of the first rolling component is greater in arithmetic mean roughness than a surface of a rolling part of the second rolling component. The arithmetic mean roughness of the surface of the rolling part of the second rolling component is 0.07 μm or more and 0.20 μm or less.

6 Claims, 7 Drawing Sheets

(56) References Cited

U.S. PATENT DOCUMENTS

| | | |
|---|---|---|
| 2005/0009713 A1 | 1/2005 | Kohara et al. |
| 2006/0126983 A1 | 6/2006 | Takemura et al. |
| 2012/0286608 A1* | 11/2012 | Komiyama ......... F16C 33/6633 310/90 |

FOREIGN PATENT DOCUMENTS

| JP | 2002-070873 A | 3/2002 |
|---|---|---|
| JP | 2002-206542 A | 7/2002 |
| JP | 2005-061495 A | 3/2005 |
| JP | 2005-112902 A | 4/2005 |
| JP | 2005-226683 A | 8/2005 |
| JP | 2006-161887 A | 6/2006 |
| JP | 2006-322017 A | 11/2006 |
| JP | 2006322017 * | 11/2006 |
| JP | 2006-348342 A | 12/2006 |
| JP | 2012-219995 A | 11/2012 |
| JP | 2016-196958 A | 11/2016 |

OTHER PUBLICATIONS

Translation of JP2012219995 obtained Oct. 26, 2020.*

Translation of JP04160225 obtained Oct. 26, 2020.*

H. Takata, et al., "Influence of Lubrication on the Fatigue Life of Roller Bearings," NSK Bearing Journal No. 642, pp. 7-13, Mar. 20, 1982.

International Search Report dated Mar. 14, 2017 issued in International Patent Application No. PCT/JP2017/00128 (with English translation).

Chinese Office Action issued in corresponding Chinese Application No. 201780007576.2, dated Sep. 6, 2019, with English translation.

Japanese Office Action issued in corresponding Japanese Patent Application No. 2016-170758, dated Mar. 9, 2021, with English translation.

* cited by examiner

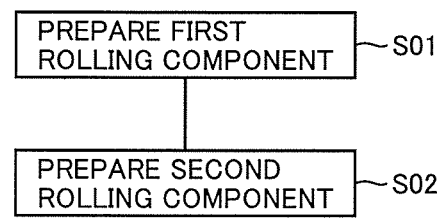
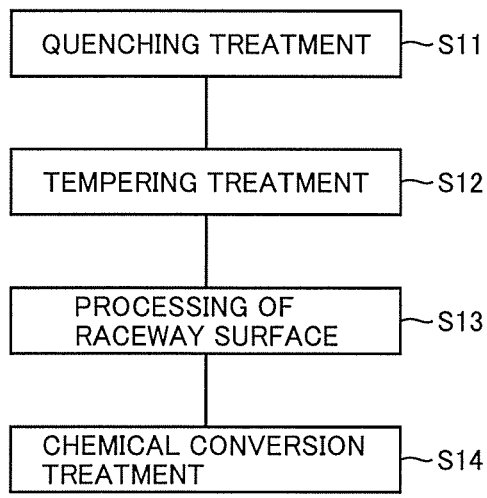
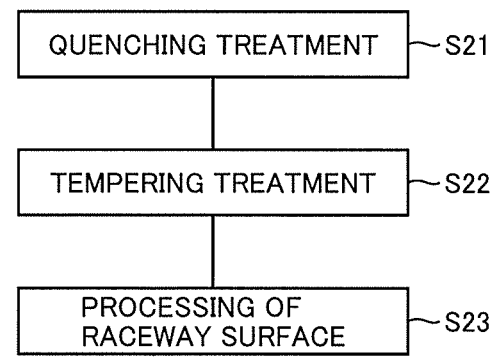

FIG.5
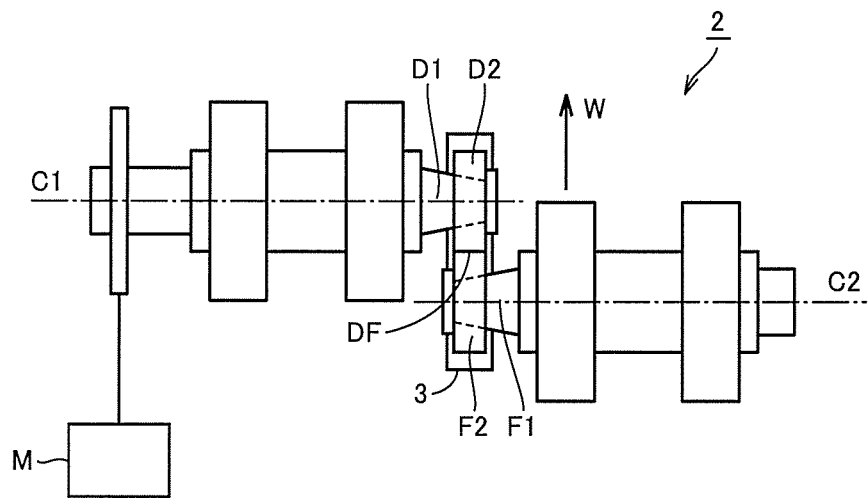
FIG.6
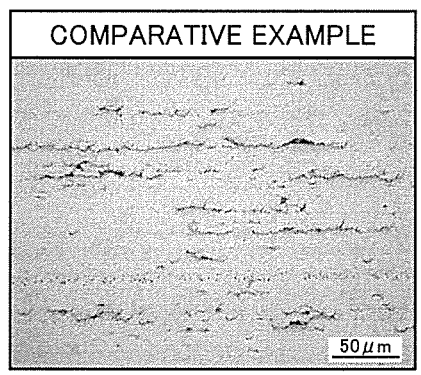
(A)
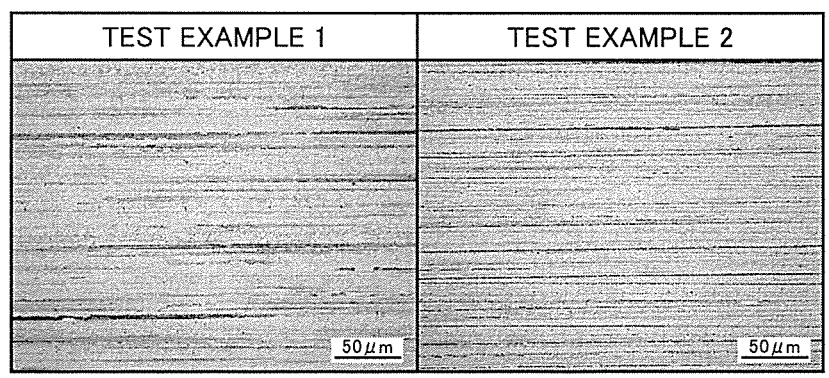
(B)

FIG.7
(A)
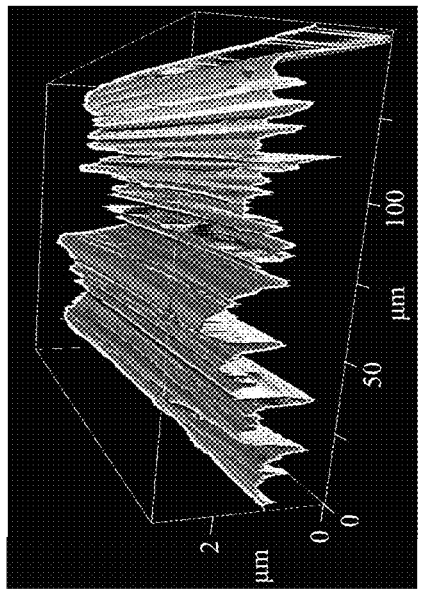
COMPARATIVE EXAMPLE
(B)
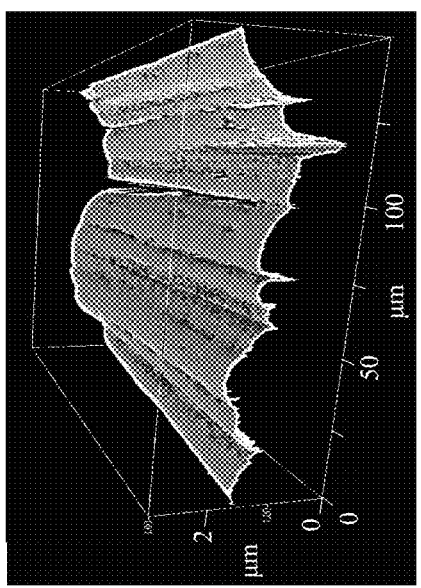
TEST EXAMPLE 2
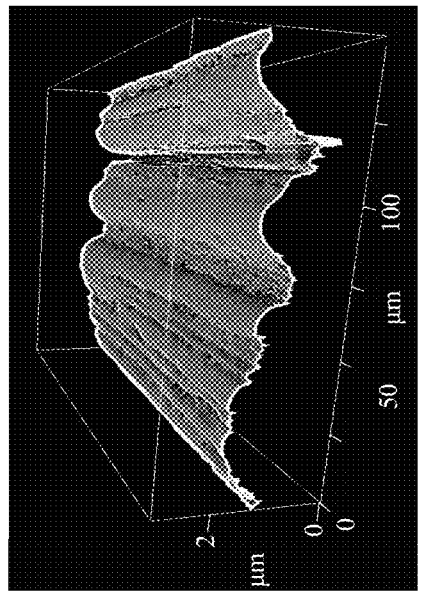
TEST EXAMPLE 1

ROLLING BEARING, ROLLING DEVICE, AND METHOD OF MANUFACTURING ROLLING DEVICE

CROSS REFERENCE

This patent application is the U.S. National Phase under 35 U.S.C. § 371 of International Application No. PCT/JP2017/000128, filed on Jan. 5, 2017, which claims the benefit of Japan Patent Application Nos. 2016-009964, filed on Jan. 21, 2016; 2016-034480, filed on Feb. 25, 2016, and 2016-170758, filed on Sep. 1, 2016, the entire contents of each are hereby incorporated by reference.

TECHNICAL FIELD

The present invention relates to a rolling bearing, a rolling device, and a method of manufacturing the rolling device, and particularly to a rolling bearing including a first rolling component and a second rolling component, a rolling device, and a method of manufacturing the rolling device.

BACKGROUND ART

When a rolling device such as a rolling bearing is used under the environment in which oil film formation is insufficient due to poor lubricity of the rolling part, surface damage such as peeling and seizure, and exfoliation originating from such surface damage occur on the surface of this rolling part. Thereby, the life of the rolling device is shortened. For example, the article titled "Influence of Lubrication on the Fatigue Life of Roller Bearings" (Non-Patent Document 1) discloses that the life of the rolling bearing is lengthened on the condition that the value of an oil film parameter $\Lambda$ showing the severity of the lubrication state between the inner and outer rings and the rolling element in the rolling bearing is about 1.2 or more, but the life of the rolling bearing is shortened on the condition that the value of oil film parameter $\Lambda$ is less than about 1.2 since surface-originating exfoliation occurs in the rolling part of the rolling bearing.

As the countermeasures against damage on the surface of the rolling bearing used in the state where the oil film formation performance is poor, for example, Japanese Patent Laying-Open No. 2006-161887 (PTD 1) discloses a method of forming micro recesses on the roller of a needle roller bearing or on the rolling part of each of the inner and outer rings, and covering the recesses with a solid lubricant. Also, for example, Japanese Patent Laying-Open No. 04-265480 (PTD 2) discloses a method of forming micro recesses at random in a rolling part to enhance the oil film formation performance. Furthermore, in addition to the above-described methods, as countermeasures against damage on the surface, there is also a method of reducing the surface roughness of the rolling part of the rolling bearing to an extent at which surface damage does not occur, for example, by super-finishing, barrel polishing, burnishing, or the like.

CITATION LIST

Patent Document

PTD 1: Japanese Patent Laying-Open No. 2006-161887
PTD 2: Japanese Patent Laying-Open No. 04-265480

Non Patent Document

NPD 1: Hirotoshi Takata, Susumu Suzuki, Etsuo Maeda, "Influence of Lubrication on the Fatigue Life of Roller Bearings", NSK Bearing Journal No. 642, pages 7 to 13

SUMMARY OF INVENTION

Technical Problem

In each of the methods disclosed in the above-mentioned PTDs, micro recesses are formed on a rolling part, in which the processing steps are complicated. Also, when the method of reducing the surface roughness of the rolling part of the rolling bearing by super-finishing or the like is used, processing may become difficult depending on the shape and the dimensions of the member to be processed. Accordingly, there may be possibilities that the surface roughness cannot be sufficiently reduced or the processing itself cannot be carried out.

The present invention has been made in light of the above-described problems. An object of the present invention is to provide a rolling bearing, a rolling device and a method of manufacturing the rolling device, by which a long life can be readily implemented by suppressing surface damage even on the use condition that the oil film formation performance of the rolling part is poor.

Solution to Problem

A rolling device of the present invention includes: a first rolling component made of high carbon chromium bearing steel; and a second rolling component made of high carbon chromium bearing steel and configured to contact the first rolling component. A surface of a rolling part of the first rolling component is greater in arithmetic mean roughness (Ra) than a surface of a rolling part of the second rolling component. The arithmetic mean roughness of the surface of the rolling part of the second rolling component is 0.07 μm or more and 0.20 μm or less.

In this way, as micro protrusions existing on the surface of the rolling part of the first rolling component come into contact with the surface of the rolling part of the second rolling component, the shapes of these micro protrusions on the first rolling component are smoothed due to friction or plastic deformation, and thereby deformed such that the slope of each protrusion is reduced. Such a phenomenon is referred to as running-in of protrusions in the present specification. This reduces the local contact pressure at the portion where the protrusions on the surfaces of the rolling parts of the first and second rolling components come into contact with each other. Accordingly, it becomes possible to suppress damage on the surface of the rolling part of the second rolling component, which is caused by contact between the protrusions on the rolling parts of the first and second rolling components. Thereby, it becomes possible to suppress shortening of the life of the rolling device caused by damage on the surface of the rolling part of the second rolling component, so that the rolling device can be lengthened in life.

In the above-described rolling device, it is preferable that the arithmetic mean roughness of the surface of the rolling part of the first rolling component is 0.70 μm or less. Thereby, due to running-in of protrusions on the surface of the rolling part of the first rolling component, the slope of each protrusion can be reduced, so that damage on the surface of the second rolling component can be suppressed.

Furthermore, even when the shapes and the dimensions of the first and second rolling components prevent processing such as super-finishing for improving the surface roughness, and when the arithmetic mean roughness of the surface of the rolling part of each of these rolling components becomes difficult to be reduced, the slope of each micro roughness protrusion on the surface of the rolling part of the first rolling component can be sufficiently reduced by combining the arithmetic mean roughnesses of the surfaces of the rolling parts of the first and second rolling components in the above-described manner. Thereby, it becomes possible to suppress shortening of the life of the rolling device caused by damage (particularly, peeling) on the surface of the rolling part of the second rolling component.

In the above-described rolling device, it is preferable that a root mean square slope of the surface of the rolling part of the second rolling component is 0.074 or more and 0.100 or less. In this way, in the same manner as described above, due to running-in of protrusions on the surface of the rolling part of the first rolling component, the slope of each protrusion can be reduced, so that damage on the surface of the second rolling component can be suppressed.

In the above-described rolling device, it is preferable that the rolling part of the first rolling component is lower in Rockwell hardness than the rolling part of the second rolling component, and the Rockwell hardness of the rolling part of the second rolling component is 61.5 HRC or more. In this way, as compared with the case where the above-described relation is not established between the hardness of the rolling part of the first rolling component and the hardness of the rolling part of the second rolling component, it becomes possible to suppress progress of fatigue on the surface of the rolling part of the second rolling component, which is caused when the micro roughness protrusions on the surface of the rolling part of the first rolling component come in contact with the surface of the rolling part of the second rolling component.

In the above description, it is preferable that the Rockwell hardness of the rolling part of the first rolling component is lower, by 0.5 HRC or more, than the Rockwell hardness of the rolling part of the second rolling component. In this case, the rolling part of the first rolling component and the rolling part of the second rolling component include the surface of the rolling part of the first rolling component and the surface of the rolling part of the second rolling component, respectively.

In the above-described rolling device, it is preferable that a film containing at least one of an iron oxide or an iron compound is provided on the surface of the rolling part of the first rolling component. Thereby, when the surface of the rolling part of the first rolling component comes in contact with the surface of the rolling part of the second rolling component, the micro protrusions on the surface of the rolling part of the first rolling component become brittle. Thus, as compared with the case where a film is not formed on the surface of the rolling part of the first rolling component and this first rolling component is formed of normal steel, running-in of the protrusions by rolling is facilitated.

It is preferable that the film in the above-described rolling device contains triiron tetraoxide. Accordingly, the material quality of the micro roughness protrusions on the surface of the rolling part of the first rolling component can be rendered brittle. Thus, as the micro roughness protrusions on the surface of the rolling part of the first rolling component come in contact with the surface of the rolling part of the second rolling component, the slope of each micro protrusion on the first rolling component can be readily sufficiently reduced.

The rolling bearing of the present invention is a rolling bearing as the above-described rolling device. The rolling bearing includes: a plurality of rolling elements; an outer ring having an outer ring raceway surface on an inner circumferential surface of the outer ring, the outer ring being disposed on an outside of the plurality of rolling elements so as to contact the plurality of rolling elements; and an inner ring having an inner ring raceway surface on an outer circumferential surface of the inner ring, the inner ring being disposed on an inside of the plurality of rolling elements so as to contact the plurality of rolling elements. The outer ring and the inner ring serve as the first rolling component, and the plurality of rolling elements serve as the second rolling component.

Even when the rolling bearing is used on the conditions that the lubrication state between each of the outer and inner rings and each rolling element is not excellent, and that the oil film formation performance is not excellent, it becomes possible to suppress damage on the surface of the rolling part of the rolling element caused by contact between micro protrusions on each of the outer and inner ring raceway surfaces and the protrusions on the rolling element. Thereby, the life of the rolling bearing can be lengthened.

The rolling bearing of the present invention is a rolling bearing as the above-described rolling device. The rolling bearing includes: a plurality of rolling elements; an outer ring having an outer ring raceway surface on an inner circumferential surface of the outer ring, the outer ring being disposed on an outside of the plurality of rolling elements so as to contact the plurality of rolling elements; and an inner ring having an inner ring raceway surface on an outer circumferential surface of the inner ring, the inner ring being disposed on an inside of the plurality of rolling elements so as to contact the plurality of rolling elements. The outer ring and the inner ring serve as the second rolling component, and the plurality of rolling elements serve as the first rolling component.

Even when the rolling bearing is used on the conditions that the lubrication state between each of the outer and inner rings and each rolling element is not excellent, and that the oil film formation performance is not excellent, it becomes possible to suppress damage on the surface of the rolling part of each of the outer and inner rings caused by contact between micro protrusions on each of the outer and inner ring raceway surfaces and the protrusions on the rolling element. Thereby, the life of the rolling bearing can be lengthened.

According to the rolling bearing of the present invention, it is preferable that a value of an oil film parameter in each of a region between the outer ring and each of the plurality of rolling elements and a region between the inner ring and each of the plurality of rolling elements is 1.2 or less.

The phenomenon of running-in of protrusions as described above progresses on the condition that oil film parameter $\Lambda$ is 1.2 or less in which the oil film formation performance of the rolling component is not excellent. Furthermore, on the condition that oil film parameter $\Lambda$ is 1.2 or less, the life is more likely to be shortened due to damage on the surface of the second rolling component caused by the protrusions on the first rolling component. Accordingly, on the condition that the life is essentially more likely to be shortened due to the condition that oil film parameter $\Lambda$ is 1.2 or less, it becomes possible to achieve an effect of suppressing damage on the surface of the rolling part of the rolling element caused by contact between micro protrusions on the outer and inner ring raceway surfaces and the protrusions on the rolling element. Thereby, the life of the rolling bearing can be lengthened by running-in of the protrusions.

In the method of manufacturing a rolling device of the present invention, a first rolling component made of high carbon chromium bearing steel is first prepared. Then, a second rolling component made of high carbon chromium bearing steel and configured to contact the first rolling component is prepared. The first rolling component and the second rolling component are processed such that a surface of a rolling part of the first rolling component is greater in arithmetic mean roughness than a surface of a rolling part of the second rolling component. The second rolling component is processed such that the arithmetic mean roughness of the surface of the rolling part of the second rolling component is 0.07 μm or more and 0.20 μm or less. In this way, the life of the rolling device can be lengthened by running-in of the protrusions as described above.

In the above-described method of manufacturing a rolling device, it is preferable that the first rolling component and the second rolling component are subjected to a quenching treatment and thereafter subjected to a tempering treatment.

In the above-described method of manufacturing a rolling device, it is preferable that the first rolling component is subjected to a chemical conversion treatment after the tempering treatment, and a film containing at least one of an iron oxide or an iron compound is formed on the surface of the rolling part of the first rolling component by the chemical conversion treatment. As compared with the case where a film is not formed on the surface of the rolling part of the first rolling component and this first rolling component is formed of normal steel, running-in of the protrusions by rolling is facilitated.

In the above-described method of manufacturing a rolling device, it is preferable that the first rolling component is subjected to the tempering treatment on a heating condition that is higher in temperature and/or longer in time period than a heating condition for the second rolling component. In other words, the first rolling component may be subjected to the tempering treatment on the heating condition that is higher in temperature and longer in time period than the heating condition for the second rolling component. In this way, the conditions for the tempering treatment performed after the quenching treatment of the first and second rolling components are adjusted. By the adjustment in this way, the first rolling component and the second rolling component are processed such that the rolling part of the first rolling component is lower in Rockwell hardness than the rolling part of the second rolling component, and that the Rockwell hardness of the rolling part of the second rolling component is 61.5 HRC or more. In this way, as compared with the case where the above-described relation is not established between the hardness of the rolling part of the first rolling component and the hardness of the rolling part of the second rolling component, it becomes possible to suppress progress of fatigue on the surface of the rolling part of the second rolling component caused when the micro roughness protrusions on the surface of the rolling part of the first rolling component come in contact with the surface of the rolling part of the second rolling component. Since there is a difference in hardness between the first rolling component and the second rolling component, the life of the rolling device can be lengthened by two effects of: running-in of protrusions; and suppression of fatigue progress.

In the above-described method of manufacturing a rolling device, it is preferable that the Rockwell hardness of the rolling part of the first rolling component is lower, by 0.5 HRC or more, than the Rockwell hardness of the rolling part of the second rolling component. Also in this case, the rolling part of the first rolling component and the rolling part of the second rolling component include the surface of the rolling part of the first rolling component and the surface of the rolling part of the second rolling component, respectively.

In the above-described method of manufacturing a rolling device, the surface of the rolling part of the first rolling component is not subjected to super-finishing, barrel polishing and burnishing. Namely, without having to perform the above-mentioned processing, the surface roughness of the rolling part can be sufficiently reduced to an extent at which surface damage does not occur.

In the above-described method of manufacturing a rolling device, the first rolling component is processed such that the arithmetic mean roughness of the surface of the rolling part of the first rolling component is 0.70 μm or less. Furthermore, the second rolling component is processed such that a root mean square slope of the surface of the rolling part of the second rolling component is 0.074 or more and 0.100 or less. Thereby, in the same manner as described above, the slope of each protrusion can be reduced by running-in of the protrusions on the surface of the rolling part of the first rolling component, so that damage on the surface of the second rolling component can be suppressed.

A rolling device of the present invention includes: a first rolling component made of high carbon chromium bearing steel; and a second rolling component made of high carbon chromium bearing steel and configured to contact the first rolling component. A surface of a rolling part of the first rolling component is lower in Rockwell hardness than a surface of a rolling part of the second rolling component. The surface of the rolling part of the first rolling component is greater in arithmetic mean roughness (Ra) than the surface of the rolling part of the second rolling component. The arithmetic mean roughness of the surface of the rolling part of the second rolling component is 0.07 μm or more and 0.10 μm or less, and a root mean square slope (RΔq) of the surface of the rolling part of the second rolling component is 0.07 or more and 0.10 or less.

In this way, when the micro protrusions existing on the surface of the rolling part of the first rolling component come in contact with the surface of the rolling part of the second rolling component, the shapes of the micro protrusions on the first rolling component are smoothed due to friction or plastic deformation, and thereby deformed such that the slope angle of each protrusion (or the curvature of the end of each protrusion) is reduced. Such a phenomenon is referred to as running-in of protrusions in the present specification. This reduces the local contact pressure at the portion where the protrusions on the surfaces of the rolling parts of the first and second rolling components come into contact with each other. Accordingly, it becomes possible to suppress damage on the surface of the rolling part of the second rolling component caused by contact between the protrusions on the rolling parts of the first and second rolling components. Thereby, it becomes possible to suppress shortening of the life of the rolling device caused by damage on the surface of the rolling part of the second rolling component, so that the life of the rolling device can be lengthened.

In the above-described rolling device, it is preferable that the Rockwell hardness of the surface of the rolling part of the first rolling component is lower, by 0.5 HRC or more, than the Rockwell hardness of the surface of the rolling part of the second rolling component. In this way, due to running-in of the protrusions on the surface of the rolling part of the first rolling component, the slope angle of each protrusion can be reduced, so that damage on the surface of the second rolling component can be suppressed.

A rolling bearing of the present invention is a rolling bearing as the above-described rolling device. The rolling bearing includes: a plurality of rolling elements; an outer ring having an outer ring raceway surface on an inner circumferential surface of the outer ring, the outer ring being disposed on an outside of the plurality of rolling elements so as to contact the plurality of rolling elements; and an inner ring having an inner ring raceway surface on an outer circumferential surface of the inner ring, the inner ring being disposed on an inside of the plurality of rolling elements so as to contact the plurality of rolling elements. The outer ring and the inner ring serve as the first rolling component, and the plurality of rolling elements serve as the second rolling component.

Even when the rolling bearing is used on the conditions that the lubrication state between each of the outer and inner rings and each rolling element is not excellent, and that the oil film formation performance is not excellent, it becomes possible to suppress damage on the surface of the rolling part of the rolling element caused by contact between the micro protrusions on each of the outer and inner ring raceway surfaces and the protrusions on the rolling element. Thereby, the life of the rolling bearing can be lengthened.

A rolling bearing of the present invention is a rolling bearing as the above-described rolling device. The rolling bearing includes: a plurality of rolling elements; an outer ring having an outer ring raceway surface on an inner circumferential surface of the outer ring, the outer ring being disposed on an outside of the plurality of rolling elements so as to contact the plurality of rolling elements; and an inner ring having an inner ring raceway surface on an outer circumferential surface of the inner ring, the inner ring being disposed on an inside of the plurality of rolling elements so as to contact the plurality of rolling elements. The outer ring and the inner ring serve as the second rolling component, and the plurality of rolling elements serve as the first rolling component.

Even when the rolling bearing is used on the conditions that the lubrication state between each of the outer and inner rings and each rolling element is not excellent, and that the oil film formation performance is not excellent, it becomes possible to suppress damage on the surface of the rolling part of each of the outer and inner rings, which is caused by contact between micro protrusions on each of the outer and inner ring raceway surfaces and the protrusions on the rolling element. Thereby, the life of the rolling bearing can be lengthened.

According to the rolling bearing of the present invention, it is preferable that a value of an oil film parameter in each of a region between the outer ring and each of the plurality of rolling elements and a region between the inner ring and each of the plurality of rolling elements is 1.2 or less.

The phenomenon of running-in of protrusions as described above progresses on the condition that oil film parameter $\Lambda$ is 1.2 or less in which the oil film formation performance of the rolling component is not excellent. Furthermore, on the condition that oil film parameter $\Lambda$ is 1.2 or less, the life is more likely to be shortened by damage on the surface of the second rolling component, which is caused by the protrusions on the first rolling component. Accordingly, on the condition that the life is essentially more likely to be shortened on the condition that oil film parameter $\Lambda$ is 1.2 or less, it becomes possible to achieve an effect of suppressing damage on the surface of the rolling part of the rolling element, which is caused by contact between micro protrusions on the outer and inner ring raceway surfaces and the protrusions on the rolling element. Thereby, the life of the rolling bearing can be lengthened by running-in of the protrusions.

In a method of manufacturing a rolling device of the present invention, a first rolling component made of high carbon chromium bearing steel is first prepared. A second rolling component made of high carbon chromium bearing steel and configured to contact the first rolling component is then prepared. The first rolling component and the second rolling component are processed such that a surface of a rolling part of the first rolling component is lower in Rockwell hardness than a surface of a rolling part of the second rolling component. The first rolling component and the second rolling component are processed such that the surface of the rolling part of the first rolling component is greater in arithmetic mean roughness than the surface of the rolling part of the second rolling component. The second rolling component is processed such that the arithmetic mean roughness of the surface of the rolling part of the second rolling component is 0.07 μm or more and 0.10 μm or less, and that a root mean square slope of the surface of the rolling part of the second rolling component is 0.07 or more and 0.10 or less. In this way, the life of the rolling device can be lengthened as described above.

In the above-described method of manufacturing a rolling device, it is preferable that the first rolling component and the second rolling component are subjected to a quenching treatment and thereafter subjected to a tempering treatment. This is a process required for achieving the function of the rolling bearing.

In the above-described method of manufacturing a rolling device, the surface of the rolling part of the first rolling component is finished by grinding or polishing using a grindstone. In other words, the surface of the rolling part of the first rolling component is not subjected to super-finishing, barrel polishing, and burnishing. Namely, without having to perform the above-mentioned processing, the surface roughness of the rolling part can be sufficiently reduced to an extent at which surface damage does not occur.

Advantageous Effects of Invention

According to the present invention, running-in of micro protrusions on the surfaces of the rolling parts of the rolling components occurs, to thereby reduce the local contact pressure at the portion where these protrusions come in contact with each other, so that it becomes possible to suppress damage on the surface of the rolling part of each rolling component and also suppress shortening of the life caused thereby.

BRIEF DESCRIPTION OF DRAWINGS

FIG. 3 is a flowchart schematically illustrating a method of manufacturing a first rolling component and a second rolling component that are included in a rolling device in the present embodiment.

FIG. 4 is a flowchart (A) illustrating the step of processing the first rolling component in each of the first and second embodiments, and a flowchart (B) illustrating the step of processing the second rolling component in each embodiment.

FIG. 5 is a schematic diagram showing the configuration of a two disk fatigue tester in the present Example.

FIG. 6 is an enlarged microscope photograph (A) of the surface of a rolling part as a test specimen on the conditions in Comparative Example of the present embodiment in Example 1, which is taken after a peeling resistance performance evaluation test, and an enlarged microscope photograph (B) of the surface of the rolling part as a test specimen on the conditions in the present embodiment, which is taken after the peeling resistance performance evaluation test.

FIG. 7 shows a three-dimensional shape (A) of the surface of the rolling part as a test specimen on the conditions in Comparative Example of the present embodiment in Example 1, which is taken after the peeling resistance performance evaluation test, and a three-dimensional shape (B) of the surface of the rolling part as a test specimen on the conditions in the present embodiment, which is taken after the peeling resistance performance evaluation test.

DESCRIPTION OF EMBODIMENTS

In the following, the present embodiments will be described with reference to the accompanying drawings.

First Embodiment

First, referring to FIGS. 1 and 2, the configuration of a rolling bearing as an example of a rolling device in the present embodiment will be hereinafter described. In this case, although a deep groove ball bearing will be described as an example of the rolling bearing, the present embodiment is applicable also to any type of rolling bearings other than the deep groove ball bearing in the same manner as follows.

Figure 1:
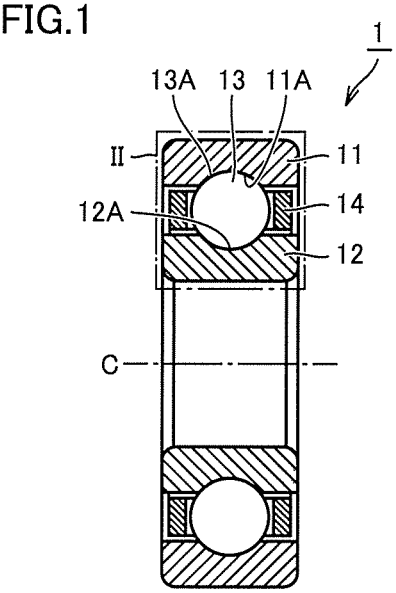
FIG. 1 is a schematic cross-sectional view showing the configuration of a deep groove ball bearing in the present embodiment.

Referring to FIG. 1, a deep groove ball bearing 1 in the present embodiment includes: an annular outer ring 11; an annular inner ring 12 disposed on the inside of outer ring 11 with respect to a center line C; a plurality of balls 13 arranged between outer ring 11 and inner ring 12 and each serving as a rolling element; and a circular cage 14 configured to hold outer ring 11, inner ring 12, and the plurality of balls 13.

Outer ring 11 is disposed so as to contact the plurality of balls 13 on the outside of the plurality of balls 13. Outer ring 11 has an outer ring raceway surface 11A on an inner circumferential surface formed on the inside of outer ring 11 with respect to center line C. Inner ring 12 is disposed so as to contact the plurality of balls 13 on the inside of the plurality of balls 13. Inner ring 12 has an inner ring raceway surface 12A on an outer circumferential surface formed on the outside of inner ring 12 with respect to center line C. Outer ring 11 and inner ring 12 are arranged such that outer ring raceway surface 11A and inner ring raceway surface 12A face each other.

Each of the plurality of balls 13 has a spherical shape and has a ball rolling surface 13A on its surface. In other words, the entire surface of each of the plurality of balls 13 serves as ball rolling surface 13A. The plurality of balls 13 are configured to roll between outer ring raceway surface 11A and inner ring raceway surface 12A. The plurality of balls 13 are arranged such that each ball rolling surface 13A comes in contact with outer ring raceway surface 11A and inner ring raceway surface 12A, and are arranged side by side at a pitch of a prescribed distance in the circumferential direction by cage 14. Thereby, each of the plurality of balls 13 is held in a freely rolling manner on a circular raceway. By the configuration as described above, outer ring 11 and inner ring 12 of deep groove ball bearing 1 are rotatable relative to each other.

Also, a grease composition (not shown) is enclosed in a raceway space as a space sandwiched between outer ring 11 and inner ring 12, more specifically, a space sandwiched between outer ring raceway surface 11A and inner ring raceway surface 12A. This grease composition forms an oil film between ball 13 and each of outer ring 11 and inner ring 12, so that the lubrication state between ball 13 and each of outer ring 11 and inner ring 12 is kept excellent. Also, the value of an oil film parameter $\Lambda$ in each of the region between outer ring 11 and each of the plurality of balls 13, and the region between inner ring 12 and each of the plurality of balls 13 is 1.2 or less.

Figure 2:
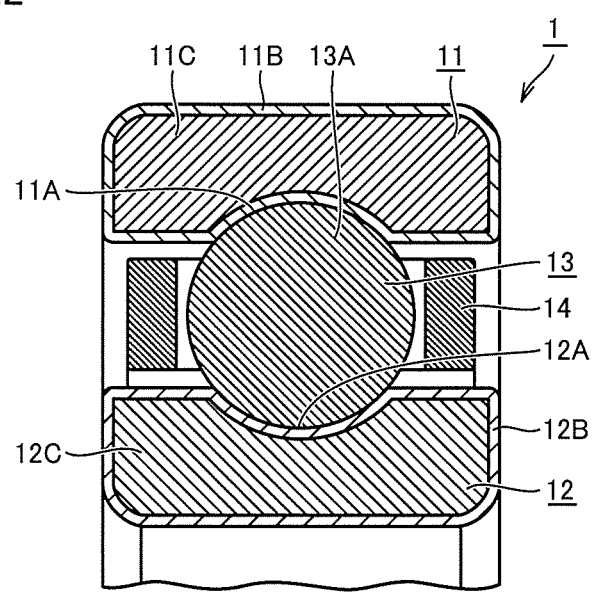
FIG. 2 is a schematic enlarged cross-sectional view showing the configuration of a region II surrounded by a dashed line in FIG. 1.

Referring to FIG. 2, outer ring 11, inner ring 12, and ball 13 each serving as a rolling component constituting deep groove ball bearing 1 will be hereinafter described. Ball 13 as the second rolling component is in contact with outer ring 11 and inner ring 12 serving as the first rolling component. Outer ring 11, inner ring 12 and ball 13 each are made, for example, of SUJ2 defined by JIS standards, which is high carbon chromium bearing steel.

In the present embodiment, the rolling part of outer ring 11 is a region including outer ring raceway surface 11A, and the surface of the rolling part of outer ring 11 constitutes outer ring raceway surface 11A. Also, the rolling part of inner ring 12 is a region including inner ring raceway surface 12A, and the surface of the rolling part of inner ring 12 constitutes inner ring raceway surface 12A. The rolling part of ball 13 is a region including ball rolling surface 13A, and the surface of the rolling part of ball 13 constitutes ball rolling surface 13A.

In the present embodiment, outer ring raceway surface 11A and inner ring raceway surface 12A are greater in arithmetic mean roughness (Ra) than ball rolling surface 13A. Specifically, the arithmetic mean roughness of each of outer ring raceway surface 11A and inner ring raceway surface 12A is 0.70 μm or less, and the arithmetic mean roughness of ball rolling surface 13A is 0.07 μm or more and 0.20 µm or less. Furthermore, the root mean square slope (RΔq) of ball rolling surface 13A is 0.074 or more and 0.100 or less.

Also in the present embodiment, the Rockwell hardness (HRC) of the surface of the rolling part of the first rolling component, that is, outer ring raceway surface 11A and inner ring raceway surface 12A, is lower, by 0.5 HRC or more, than the Rockwell hardness of the surface of the rolling part of the second rolling component, that is, ball rolling surface 13A. Furthermore, the Rockwell hardness of ball rolling surface 13A is 61.5 HRC or more.

Then, a film 11B is formed on the surface of the rolling part of outer ring 11. Also, a film 12B is formed on the surface of the rolling part of inner ring 12. These films 11B and 12B each contain at least one of an iron oxide or an iron compound, and particularly preferably contain triiron tetraoxide in this case. In other words, it is preferable that each of film 11B formed on the surface of the rolling part of outer ring 11 and film 12B formed on the surface of the rolling part of inner ring 12 is formed by black oxide finishing.

Then, referring to FIGS. 3 and 4, the method of processing each of outer ring 11, inner ring 12 and ball 13 described above will be hereinafter described.

Referring to FIG. 3, outer ring 11 and inner ring 12 each made of SUJ2 defined by JIS standards and serving as the first rolling component are prepared (S01). Then, ball 13 made of SUJ2 defined by HS standards and serving as the second rolling component is prepared (S02).

Referring to FIG. 4(A), regarding outer ring 11 and inner ring 12 serving as the first rolling component, SUJ2 defined by HS standards as a material is subjected to a quenching treatment (S11) and thereafter subjected to a tempering treatment (S12). Then, the resulting product is processed such that outer ring raceway surface 11A of outer ring 11 and inner ring raceway surface 12A of inner ring 12 are greater in arithmetic mean roughness than ball rolling surface 13A of ball 13. Specifically, the process is performed such that the arithmetic mean roughness of each of outer ring raceway surface 11A and inner ring raceway surface 12A is 0.70 µm or less (S13). Then, a chemical conversion treatment (S14) is further performed. By this chemical conversion treatment, film 11B and film 12B each containing at least one of an iron oxide and an iron compound are respectively formed on the outer ring raceway surface 11A serving as the surface of the rolling part of outer ring 11 and inner ring raceway surface 12A serving as the surface of the rolling part of inner ring 12.

Referring to FIG. 4(B), regarding ball 13 as the second rolling component, SUJ2 defined by JIS standards as a material is subjected to a quenching treatment (S21) and thereafter subjected to a tempering treatment (S22). Then, the resulting product is processed such that ball rolling surface 13A of ball 13 is lower in arithmetic mean roughness than outer ring raceway surface 11A of outer ring 11 and inner ring raceway surface 12A of inner ring 12. Specifically, the process is performed such that the arithmetic mean roughness of ball rolling surface 13A is 0.07 µm or more and 0.20 µm or less, and that the root mean square slope (RΔq) of ball rolling surface 13A is 0.074 or more and 0.100 or less (S23). Subsequently, no chemical conversion treatment is performed.

When comparing the condition for the tempering treatment of outer ring 11 and inner ring 12 (S12) and the condition for the tempering treatment of ball 13 (S22), the heating condition for the tempering treatment (S12) is higher in temperature and/or longer in time period than the condition for the tempering treatment (S22). In other words, the heating condition for the tempering treatment (S12) may be higher in temperature and longer in time period than the heating condition for the tempering treatment (S22). Alternatively, the heating condition for the tempering treatment (S12) may be higher in temperature but not longer in time period than the heating condition for the tempering treatment (S22), or the heating condition for the tempering treatment (S12) may be not higher in temperature but longer in time period than the heat condition for the tempering treatment (S22).

By adjusting the condition for the tempering treatment, outer ring 11, inner ring 12 and ball 13 are processed such that outer ring raceway surface 11A and inner ring raceway surface 12A are lower in Rockwell hardness than ball rolling surface 13A, and that the Rockwell hardness of ball rolling surface 13A is 61.5 HRC or more.

Then, the functions and effects of the present embodiment will be described.

In deep groove ball bearing 1 of the present embodiment, outer ring raceway surface 11A as the surface of the rolling part of outer ring 11 and inner ring raceway surface 12A as the surface of the rolling part of inner ring 12 are greater in arithmetic mean roughness than ball rolling surface 13A as the surface of rolling part of ball 13. Specifically, the arithmetic mean roughness of each of outer ring raceway surface 11A and inner ring raceway surface 12A is 0.70 µm or less, and the arithmetic mean roughness of ball rolling surface 13A is 0.07 µm or more and 0.20 µm or less. Furthermore, the root mean square slope of ball rolling surface 13A is 0.074 or more and 0.100 or less. By combining specific arithmetic mean roughnesses and the like in the above-described numerical value range, it is more likely to cause running-in of a large number of micro protrusions included in outer ring raceway surface 11A and inner ring raceway surface 12A that are greater in value of arithmetic mean roughness than ball rolling surface 13A, for example, as compared with the case where the value of the arithmetic mean roughness of ball rolling surface 13A is less than 0.07 µm. Also, film 11B and film 12B each containing at least one of an iron oxide and an iron compound are formed by the chemical conversion treatment on the surface of the rolling part of each of outer ring 11 and inner ring 12, respectively. Thus, outer ring raceway surface 11A and inner ring raceway surface 12A become more brittle than the case where the chemical conversion treatment is not performed. Consequently, the roughness of each of outer ring raceway surface 11A and inner ring raceway surface 12A can be modified such that running-in of micro protrusions is further more likely to occur.

By the above-described two effects, when outer ring raceway surface 11A and inner ring raceway surface 12A come in contact with ball rolling surface 13A after a lapse of a short time period since start of the operation of deep groove ball bearing 1, the slope of each micro protrusion on outer ring raceway surface 11A and inner ring raceway surface 12A can be reduced. This reduces the local contact pressure between: the micro protrusions on outer ring raceway surface 11A and inner ring raceway surface 12A; and the flat surface or micro protrusions on ball rolling surface 13A that come in contact with the micro protrusions on outer ring raceway surface 11A and inner ring raceway surface 12A. Accordingly, it becomes possible to suppress occurrence of damage on ball rolling surface 13A, for example, caused by the micro protrusions on outer ring raceway surface 11A and inner ring raceway surface 12A. Therefore, it becomes possible to suppress shortening of the life of deep groove ball bearing 1 caused by damage on ball rolling surface 13A, for example, without having to employ a method of covering, with a solid lubricant, micro protrusions formed randomly on the surface such as outer ring raceway surface 11A. Consequently, the life of deep groove ball bearing 1 can be lengthened.

In deep groove ball bearing 1 of the present embodiment, the Rockwell hardness of each of outer ring raceway surface 11A and inner ring raceway surface 12A is adjusted to be relatively lower than the Rockwell hardness of ball rolling surface 13A. Furthermore, the Rockwell hardness of ball rolling surface 13A is adjusted to be 61.5 HRC or more. In this way, even when deep groove ball bearing 1 is used on the condition that the oil film formation performance is not excellent since the lubrication state between ball 13 and each of outer ring 11 and inner ring 12 is not excellent, and also when micro protrusions on outer ring raceway surface 11A and inner ring raceway surface 12A come into contact with ball rolling surface 13A, damage or fatigue progress on ball rolling surface 13A can be suppressed. Thereby, the life of deep groove ball bearing 1 can be further lengthened. When outer ring raceway surface 11A and inner ring raceway surface 12A are subjected to the tempering treatment on the heating condition that is higher in temperature and/or longer in time period than the heating condition for ball rolling surface 13A, outer ring raceway surface 11A and inner ring raceway surface 12A can be processed such that the hardness of each of outer ring raceway surface 11A, inner ring raceway surface 12A and ball rolling surface 13A is set on the above-described conditions.

Furthermore, in deep groove ball bearing 1 of the present embodiment, the value of oil film parameter Λ in each of the region between outer ring 11 and each of the plurality of balls 13 and the region between inner ring 12 and each of the plurality of balls 13 is 1.2 or less. On the condition that the value of the oil film parameter Λ is 1.2 or less, more frequent contact occurs between the micro roughness protrusions on outer ring 11 and ball 13, and between the micro roughness protrusions on inner ring 12 and ball 13. This causes running-in of the micro roughness protrusions on the rolling parts of outer ring 11 and inner ring 12. Therefore, on the condition that the life of deep groove ball bearing 1 is more likely to be shortened due to occurrence of surface-originating exfoliation on ball rolling surface 13A, it becomes possible to suppress damage on ball rolling surface 13A caused by contact with the micro protrusions on outer ring raceway surface 11A and inner ring raceway surface 12A. Thereby, the life of deep groove ball bearing 1 can be effectively lengthened.

Damage on ball rolling surface 13A is suppressed by the above-described method. Accordingly, in the present embodiment, outer ring raceway surface 11A, inner ring raceway surface 12A and ball rolling surface 13A do not need to be subjected to any of super-finishing, barrel polishing, and burnishing. Thus, the step of processing deep groove ball bearing 1 can be simplified and can be reduced in cost.

Second Embodiment

Since deep groove ball bearing 1 in the present embodiment can be described similarly using basically the same drawings as those of deep groove ball bearing 1 in the first embodiment, detailed description thereof will not be repeated. However, in deep groove ball bearing 1 in the present embodiment, ball 13 is disposed as the first rolling component, and outer ring 11 and inner ring 12 are disposed as the second rolling component. In this point, deep groove ball bearing 1 in the present embodiment is different from deep groove ball bearing 1 in the first embodiment.

Thus, in the present embodiment, ball rolling surface 13A is greater in arithmetic mean roughness than outer ring raceway surface 11A and inner ring raceway surface 12A; the arithmetic mean roughness of ball rolling surface 13A is 0.70 μm or less; and the arithmetic mean roughness of each of outer ring raceway surface 11A and inner ring raceway surface 12A is 0.07 μm or more and 0.20 μm or less. Also, after the tempering treatment, ball 13 is subjected to a chemical conversion treatment. Furthermore, in the present embodiment, ball rolling surface 13A is lower in Rockwell hardness (HRC) than outer ring raceway surface 11A and inner ring raceway surface 12A, and the Rockwell hardness of each of outer ring raceway surface 11A and inner ring raceway surface 12A is 61.5 HRC or more. It is preferable that the Rockwell hardness (HRC) of ball rolling surface 13A is lower, by 0.5 HRC or more, than the Rockwell hardness of each of outer ring raceway surface 11A and inner ring raceway surface 12A.

Also in the present embodiment, basically in the same manner as in the first embodiment, it becomes possible to enhance the effect of suppressing the damage on outer ring raceway surface 11A and inner ring raceway surface 12A serving as the second rolling component in this case.

Third Embodiment

First referring to FIGS. 9 and 10, the configuration of a rolling bearing as an example of the rolling device in the present embodiment will be hereinafter described. In this case, although a tapered roller bearing and a cylindrical roller bearing will be described as an example of the rolling bearing, the present embodiment is applicable also to any type of rolling bearings other than the tapered roller bearing and the cylindrical roller bearing in the same manner as follows.

Figure 9:
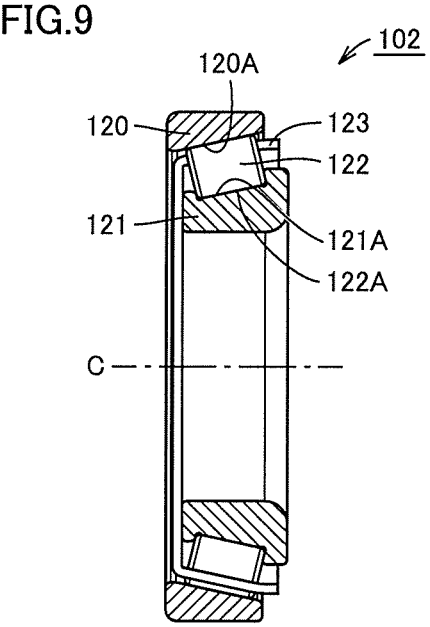
FIG. 9 is a schematic cross-sectional view showing the configuration of a tapered roller bearing in the present embodiment.

Referring to FIG. 9, a tapered roller bearing 102 in the present embodiment includes: an annular outer ring 120; an annular inner ring 121 disposed on the inside of outer ring 120 with respect to a center line C; a plurality of rollers 122 arranged between outer ring 120 and inner ring 121, and each serving as a rolling element; and a circular cage 123 configured to hold outer ring 120, inner ring 121 and the plurality of rollers 122.

Outer ring 120 is disposed so as to contact the plurality of rollers 122 on the outside of the plurality of rollers 122. Outer ring 120 has an outer ring raceway surface 120A on an inner circumferential surface formed on the inside of outer ring 120 with respect to center line C. Inner ring 121 is disposed so as to contact the plurality of rollers 122 on the inside of the plurality of rollers 122. Inner ring 121 has an inner ring raceway surface 121A on an outer circumferential surface formed on the outside of inner ring 121 with respect to center line C. Outer ring 120 and inner ring 121 are arranged such that outer ring raceway surface 120A and inner ring raceway surface 121A face each other.

Each of the plurality of rollers 122 has a roller rolling surface 122A on its surface. In other words, the entire surface of each of the plurality of rollers 122 constitutes roller rolling surface 122A. Each of the plurality of rollers 122 is configured so as to roll between outer ring raceway surface 120A and inner ring raceway surface 121A. The plurality of rollers 122 each come into contact, at roller rolling surface 122A, with outer ring raceway surface 120A and inner ring raceway surface 121A, and are arranged side by side at a pitch of a prescribed distance in the circumferential direction by cage 123. Thereby, each of the plurality of rollers 122 is held in a freely rolling manner on a circular raceway of each of outer ring 120 and inner ring 121.

Cage 123 is made of synthetic resin. Furthermore, tapered roller bearing 102 is configured such that the vertex of the circular cone including outer ring raceway surface 120A, the vertex of the circular cone including inner ring raceway surface 121A, and the vertex of the circular cone including the track of the rotation axis obtained in accordance with rolling of roller 122 intersect one another at one point on the center line of the bearing. By the configuration as described above, outer ring 120 and inner ring 121 of tapered roller bearing 102 are rotatable relative to each other.

Figure 10:
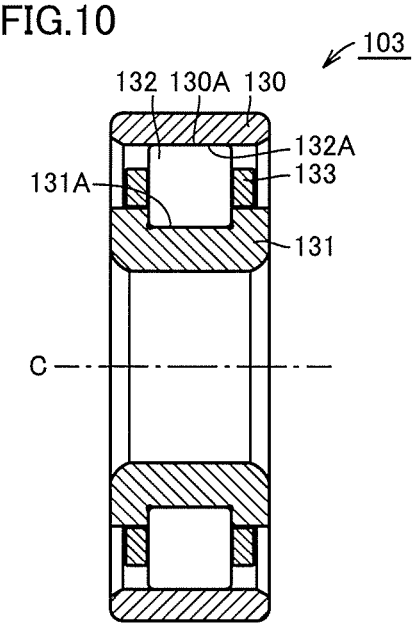
FIG. 10 is a schematic cross-sectional view showing the configuration of a cylindrical roller bearing in the present embodiment.

Referring to FIG. 10, a cylindrical roller bearing 103 in the present embodiment includes: an annular outer ring 130; an annular inner ring 131 disposed on the inside of outer ring 130 with respect to center line C; a plurality of rollers 132 each arranged between outer ring 130 and inner ring 131 and serving as a rolling element; and a circular cage 133 configured to hold outer ring 130, inner ring 131 and the plurality of rollers 132.

Outer ring 130 is disposed so as to contact the plurality of rollers 132 on the outside of the plurality of rollers 132. Outer ring 130 has an outer ring raceway surface 130A on an inner circumferential surface formed on the inside of outer ring 130 with respect to center line C. Inner ring 131 is disposed so as to contact the plurality of rollers 132 on the inside of the plurality of rollers 132. Inner ring 131 has an inner ring raceway surface 131A on an outer circumferential surface formed on the outside of inner ring 131 with respect to center line C. Outer ring 130 and inner ring 131 are arranged such that outer ring raceway surface 130A and inner ring raceway surface 131A face each other. Each of the plurality of rollers 132 is formed in a cylinder shape having a roller rolling surface 132A on its surface. In other words, the entire surface of each of the plurality of rollers 132 constitutes roller rolling surface 132A. Each of the plurality of rollers 132 is formed so as to roll between outer ring raceway surface 130A and inner ring raceway surface 131A. The plurality of rollers 132 each come into contact, at roller rolling surface 132A, with outer ring raceway surface 130A and inner ring raceway surface 131A, and are arranged side by side at a pitch of a prescribed distance in the circumferential direction by cage 133. Thereby, each of the plurality of rollers 132 is held in a freely rolling manner on a circular raceway of each of outer ring 130 and inner ring 131.

Cage 133 is made of synthetic resin. By the configuration as described above, outer ring 130 and inner ring 131 of cylindrical roller bearing 103 are rotatable relative to each other.

Furthermore, a grease composition (not shown) is enclosed in a raceway space as a space sandwiched between outer ring 120 and inner ring 121, more specifically, a space sandwiched between outer ring raceway surface 120A and inner ring raceway surface 121A. This grease composition forms an oil film between roller 122 and each of outer ring 120 and inner ring 122. Also, the value of oil film parameter Λ in each of the region between outer ring 120 and each of the plurality of rollers 122 and the region between inner ring 121 and each of the plurality of rollers 122 is 1.2 or less. Although not described in detail, a grease composition is enclosed in a raceway space as a space sandwiched between outer ring raceway surface 130A and inner ring raceway surface 131A, also in FIG. 10 as similarly to FIG. 9.

Then, outer ring 120, inner ring 121 and roller 122 serving as rolling components constituting tapered roller bearing 102 will be hereinafter described. Roller 122 as the second rolling component contacts each of outer ring 120 and inner ring 121 serving as the first rolling component. Outer ring 120, inner ring 121 and roller 122 each are made, for example, of SUJ2 defined by JIS standards that is high carbon chromium bearing steel. It is to be noted that outer ring 130, inner ring 131 and roller 132 constituting cylindrical roller bearing 103 are the same as those described above.

In the present embodiment, for example, the rolling part of outer ring 120 in FIG. 9 is a region including outer ring raceway surface 120A, and the surface of the rolling part of outer ring 120 constitutes outer ring raceway surface 120A. Also, the rolling part of inner ring 121 is a region including inner ring raceway surface 121A, and the surface of the rolling part of inner ring 121 constitutes inner ring raceway surface 121A. The rolling part of roller 122 is a region including roller rolling surface 122A, and the surface of the rolling part of roller 122 constitutes roller rolling surface 122A.

In the present embodiment, outer ring raceway surface 120A and inner ring raceway surface 121A are lower in Rockwell hardness than roller rolling surface 122A. Specifically, it is preferable that the Rockwell hardness of each of outer ring raceway surface 120A and inner ring raceway surface 121A is lower, by 0.5 HRC or more, than the Rockwell hardness of roller rolling surface 122A.

Also in the present embodiment, outer ring raceway surface 120A and inner ring raceway surface 121A are greater in arithmetic mean roughness (Ra) defined by JIS B 0601-2001 than roller rolling surface 122A. Furthermore, outer ring raceway surface 120A and inner ring raceway surface 121A are greater in root mean square slope (RΔq) defined by JIS B 0601-2001 than roller rolling surface 122A.

Specifically, the arithmetic mean roughness of each of outer ring raceway surface 120A and inner ring raceway surface 121A is set to be 0.70 μm or less, and the root mean square slope of each of outer ring raceway surface 120A and inner ring raceway surface 121A is set to be 0.30 or less. Also, the arithmetic mean roughness of roller rolling surface 122A is set to be 0.07 μm or more and 0.10 μm or less, and the root mean square slope of roller rolling surface 122A is set to be 0.07 or more and 0.10 or less.

Although not described in detail, the characteristics such as the numerical values, the magnitude relation and the like of the Rockwell hardness, the arithmetic mean roughness and the root mean square slope as described above are also applicable to those of outer ring raceway surface 130A of outer ring 130, inner ring raceway surface 131A of inner ring 131, and roller rolling surface 132A of roller 132 in FIG. 10.

Then, the method of processing each of the above-described outer ring 120, inner ring 121 and roller 122 will be hereinafter described with reference to FIGS. 3, 4(B) and 11. Although not described in detail, the method of processing each of outer ring 130, inner ring 131 and roller 132 is basically the same.

Referring to FIG. 3, outer ring 120 and inner ring 121 each made of SUJ2 defined by JIS standards and serving as the first rolling component are prepared (S01). Then, roller 122 made of SUJ2 defined by JIS standards and serving as the second rolling component is prepared (S02).

Figure 11:
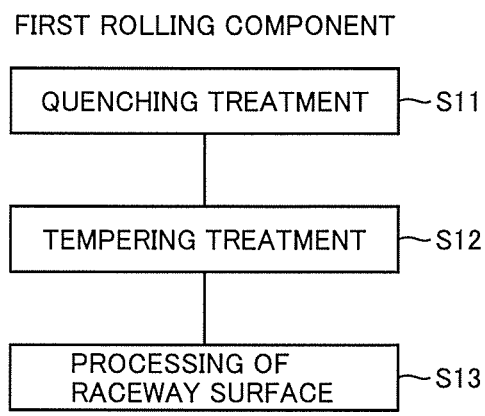
FIG. 11 is a flowchart illustrating the step of processing a first rolling component in each of the third and fourth embodiments.

Referring to FIG. 11, regarding outer ring 120 and inner ring 121 as the first rolling component, SUJ2 defined by JIS standards as a material is subjected to a quenching treatment (S11), and thereafter, subjected to a tempering treatment (S12).

Then, outer ring raceway surface 120A and inner ring raceway surface 121A are processed (S13). In this case, outer ring raceway surface 120A and inner ring raceway surface 121A are processed such that outer ring raceway surface 120A and inner ring raceway surface 121A are lower in Rockwell hardness than roller rolling surface 122A. Furthermore, outer ring raceway surface 120A and inner ring raceway surface 121A are processed such that outer ring raceway surface 120A of outer ring 120 and inner ring raceway surface 121A of inner ring 121 are greater in arithmetic mean roughness than roller rolling surface 122A of roller 122. Furthermore, outer ring raceway surface 120A and inner ring raceway surface 121A are processed such that outer ring raceway surface 120A and inner ring raceway surface 121A are greater in root mean square slope than roller rolling surface 122A.

Specifically, it is preferable that the Rockwell hardness of each of outer ring raceway surface 120A and inner ring raceway surface 121A is lower, by 0.5 HRC or more, than the Rockwell hardness of roller rolling surface 122A. The process is performed such that the arithmetic mean roughness of each of outer ring raceway surface 120A and inner ring raceway surface 121A is 0.70 μm or less, and that the root mean square slope of each of outer ring raceway surface 120A and inner ring raceway surface 121A is 0.30 or less.

Referring to FIG. 4(B), regarding roller 122 as the second rolling component, SUJ2 defined by JIS standards as a material is subjected to a quenching treatment (S21), and thereafter subjected to a tempering treatment (S22). Then, the process is performed such that roller rolling surface 122A of roller 122 is less in arithmetic mean roughness than outer ring raceway surface 120A of outer ring 120 and inner ring raceway surface 121A of inner ring 121. Specifically, the process is performed such that the arithmetic mean roughness of roller rolling surface 122A is 0.07 μm or more and 0.10 μm or less, and that the root mean square slope of roller rolling surface 122A is 0.07 or more and 0.10 or less (S23).

The process for each raceway surface in each of the above-described step (S13) and step (S23) is finished by grinding or polishing using a grindstone. In other words, outer ring raceway surface 120A and inner ring raceway surface 121A as the first rolling component do not need to be particularly subjected to any processing such as super-finishing, barrel polishing and burnishing for improving the surface roughness. For example, even when it is difficult to subject outer ring raceway surface 120A and inner ring raceway surface 121A to super-finishing and the like for reducing the arithmetic mean roughness, the root mean square slope and the like due to restrictions by their shapes and dimensions, the values of the arithmetic mean roughness and the root mean square slope of roller rolling surface 122A and the values of the arithmetic mean roughness and the root mean square slope of each of raceway surfaces 120A and 121A may be combined in the above-mentioned value range.

In this way, without having to subject outer ring raceway surface 120A and inner ring raceway surface 121A to super-finishing or the like, the end shape of each protrusion on each of outer ring raceway surface 120A and inner ring raceway surface 121A can be smoothed by running-in. Accordingly, it becomes possible to reduce the possibility that damage such as peeling caused by rolling fatigue occurs on roller rolling surface 122A. Consequently, it becomes possible to suppress shortening of the life of the rolling device caused by such damage.

Then, the functions and effects of the present embodiment will be described.

In tapered roller bearing 102 in the present embodiment, the Rockwell hardness of outer ring raceway surface 120A as the surface of the rolling part of outer ring 120 and the Rockwell hardness of inner ring raceway surface 121A as the surface of the rolling part of inner ring 121 are lower, by 0.5 HRC or more, than the Rockwell hardness of roller rolling surface 122A as the surface of the rolling part of roller 122. Also, outer ring raceway surface 120A and inner ring raceway surface 121A are greater in arithmetic mean roughness than roller rolling surface 122A. Furthermore, the process is performed such that the arithmetic mean roughness of roller rolling surface 122A is 0.07 μm or more and 0.10 μm or less, and that the root mean square slope of roller rolling surface 122A is 0.07 or more and 0.10 or less.

By combining specific arithmetic mean roughness and the like in the above-described numerical value range, it is more likely to cause running-in of a large number of micro protrusions included in outer ring raceway surface 120A and inner ring raceway surface 121A that are greater in value of arithmetic mean roughness than roller rolling surface 122A, for example, as compared with the case where the value of the arithmetic mean roughness of roller rolling surface 122A is less than 0.07 μm. Furthermore, when the surface of the rolling part of each of outer ring 120 and inner ring 121 is lower in Rockwell hardness than roller rolling surface 122A, the roughness of each of outer ring raceway surface 120A and inner ring raceway surface 121A can be modified such that running-in of micro protrusions is further more likely to occur.

By the above-described two effects, when outer ring raceway surface 120A and inner ring raceway surface 121A come in contact with roller rolling surface 122A after a lapse of a short time period since start of the operation of tapered roller bearing 102, the roughness protrusions existing on roller rolling surface 122A cause wear and plastic deformation to occur in large protrusions existing on outer ring raceway surface 120A and inner ring raceway surface 121A. This facilitates running-in of large protrusions and the like existing on outer ring raceway surface 120A and inner ring raceway surface 121A, so that the end shape of each protrusion is smoothed. This reduces the local contact pressure between: the micro protrusions on outer ring raceway surface 120A and inner ring raceway surface 121A; and the flat surface or micro protrusions on roller rolling surface 122A that come in contact with the micro protrusions on outer and inner ring raceway surfaces 120A and 121A. Accordingly, it becomes possible to suppress occurrence of damage on roller rolling surface 122A, for example, caused by the micro protrusions on outer ring raceway surface 120A and inner ring raceway surface 121A. Therefore, it becomes possible to suppress shortening of the life of tapered roller bearing 102 caused by damage on roller rolling surface 122A, for example, without having to employ a method of covering, with a solid lubricant, micro protrusions formed randomly on the surface such as outer ring raceway surface 120A. Consequently, the life of tapered roller bearing 102 can be lengthened.

Furthermore, according to tapered roller bearing 102 in the present embodiment, the values of the arithmetic mean roughness and the like of outer ring raceway surface 120A, inner ring raceway surface 121A and roller rolling surface 122A are adjusted as described above. Thus, even when tapered roller bearing 102 is used on the condition that the oil film formation performance is not excellent since the lubrication state between roller 122 and each of outer ring 120 and inner ring 121 is not excellent, it becomes possible to suppress occurrence of damage on roller rolling surface 122A, which is caused by contact with the micro protrusions on outer ring raceway surface 120A and inner ring raceway surface 121A. Thereby, the life of tapered roller bearing 102 can be lengthened.

Furthermore, in tapered roller bearing 102 in the present embodiment, the value of oil film parameter Λ in each of the region between outer ring 120 and each of the plurality of rollers 122 and the region between inner ring 121 and each of the plurality of rollers 122 is 1.2 or less. Accordingly, on the condition that the life of tapered roller bearing 102 is more likely to be shortened due to occurrence of surface-originating exfoliation on roller rolling surface 122A, it becomes possible to suppress damage on roller rolling surface 122A caused by contact with the micro protrusions on outer ring raceway surface 120A and inner ring raceway surface 121A. Thereby, the life of tapered roller bearing 102 can be effectively lengthened.

Since damage on roller rolling surface 122A is suppressed by the above-described method, in the present embodiment, outer ring raceway surface 120A, inner ring raceway surface 121A, and roller rolling surface 122A do not need to be subjected to super-finishing, barrel polishing, and burnishing. Accordingly, the step of processing tapered roller bearing 102 can be simplified and can be reduced in cost.

Fourth Embodiment

Since tapered roller bearing 102 in the present embodiment can be described similarly using basically the same drawings as those of tapered roller bearing 102 in the third embodiment, detailed description thereof will not be repeated. However, in tapered roller bearing 102 in the present embodiment, roller 122 is disposed as the first rolling component, and outer ring 120 and inner ring 121 are disposed as the second rolling component. In this point, tapered roller bearing 102 in the present embodiment is different from tapered roller bearing 102 in the third embodiment.

Accordingly, in the present embodiment, the Rockwell hardness of roller rolling surface 122A is lower, for example, by 0.5 HRC or more, than the Rockwell hardness of each of outer ring raceway surface 120A and inner ring raceway surface 121A. Also, roller rolling surface 122A is greater in arithmetic mean roughness than outer ring raceway surface 120A and inner ring raceway surface 121A. The arithmetic mean roughness of each of outer ring raceway surface 120A and inner ring raceway surface 121A is 0.07 μm or more and 0.10 μm or less. The root mean square slope of each of outer ring raceway surface 120A and inner ring raceway surface 121A is 0.07 or more and 0.10 or less. Furthermore, roller rolling surface 122A is greater in root mean square slope than outer ring raceway surface 120A and inner ring raceway surface 121A. The arithmetic mean roughness of roller rolling surface 122A is 0.70 μm or less, and the root mean square slope of roller rolling surface 122A is 0.30 or less.

Also in cylindrical roller bearing 103, roller 132 can be applied as the first rolling component, and outer ring 130 and inner ring 131 can be applied as the second rolling component, as in tapered roller bearing 102. In addition, the method of manufacturing these tapered roller bearing 102 and cylindrical roller bearing 103 is basically the same as that in the third embodiment even though the first rolling component and the second rolling component are defined in relation opposite to that defined in the third embodiment. Thus, the detailed description thereof will not be repeated.

Also in the present embodiment, basically in the same manner as in the third embodiment, it becomes possible to enhance the effect of suppressing damage on outer ring raceway surface 120A and inner ring raceway surface 121A that serve as the second rolling component in this case.

Example 1

In order to examine the functions and effects achieved by the configuration in each embodiment as described above, three types of peeling resistance performance evaluation tests were conducted using three types of test specimens. Particularly in Example 1, the test focused on the surface roughness conditions for the rolling part of each of the first and second rolling components was conducted. In the following, the details and results of this test will be described with reference to FIGS. 5 to 7.

Referring to FIG. 5, the figures shows a two disk fatigue tester 2 used for the peeling resistance performance evaluation test. Two disk fatigue tester 2 includes a driving-side rotation shaft D1 and a driven-side rotation shaft F1.

Driving-side rotation shaft D1 is a member extending in the right-left direction in FIG. 5. Driving-side rotation shaft D1 has a base end on the left side in FIG. 5, to which a motor M is connected. This motor M allows driving-side rotation shaft D1 to be rotatable relative to a central axis C1 extending in the right-left direction in FIG. 5. Driving-side rotation shaft D1 has a leading end on the right side in FIG. 5, to which a driving-side test specimen D2 is attached. Driving-side test specimen D2 is a member corresponding to the first rolling component in each of the above-described embodiments, and fixed to the leading end on the right side of driving-side rotation shaft D1 so as to be rotatable about central axis C1 in accordance with rotation of driving-side rotation shaft D1.

On the other hand, driven-side rotation shaft F1 is a member extending in the right-left direction in FIG. 5, and is rotatable about a central axis C2 extending in the right-left direction in FIG. 5. Driven-side rotation shaft F1 in FIG. 5 has a leading end on its left side and a base end on its right side, in contrast to driving-side rotation shaft D1. A driven-side test specimen F2 is attached to the leading end on the left side of driven-side rotation shaft F1 in FIG. 5. Driven-side test specimen F2 is a member corresponding to the second rolling component in each of the above-described embodiments, and is fixed to the leading end on the left side of driven-side rotation shaft F1 so as to be rotatable about central axis C2 in accordance with rotation of driven-side rotation shaft F1.

The leading end of driving-side rotation shaft D1 is directed rightward in FIG. 5 while the leading end of driven-side rotation shaft F1 is directed leftward in FIG. 5. However, central axis C1 of driving-side rotation shaft D1 and central axis C2 of driven-side rotation shaft F1 are not aligned with each other, but there is a distance between central axis C1 and central axis C2 in the up-down direction in FIG. 5. Accordingly, driving-side test specimen D2 fixed to the leading end of driving-side rotation shaft D1 and driven-side test specimen F2 fixed to the leading end of driven-side rotation shaft F1 are arranged such that the outside surfaces of driving-side rotation shaft D1 and driven-side rotation shaft F1 come into contact with each other at an outside surface contact portion DF in the state where driving-side rotation shaft D1 and driven-side rotation shaft F1 do not rotate. In addition, driving-side test specimen D2 and driven-side test specimen F2 that are arranged so as to contact each other are in contact with an oil-feeding felt pad 3 that is placed under these driving-side test specimen D2 and driven-side test specimen F2.

Table 1 shows the driving conditions for the equipment of two disk fatigue tester 2 installed as described above.

TABLE 1

| Lubricating Oil | Additive-Free Poly-α-Olefin Oil (equivalent to VG5) |
|---|---|
| Number of Rotations | 2000 rpm |
| Load | 230 kgf |
| Test Time Period | 100 min |
| Number of Times of Load to be Applied | 200,000 |

As shown in Table 1, additive-free poly-α-olefin oil (equivalent to 5 VG) was used as lubricating oil in two disk fatigue tester 2. Oil-feeding felt pad 3 is impregnated with this lubricating oil, from which the lubricating oil is fed to the outside surface of each of driving-side test specimen D2 and driven-side test specimen F2. Also as the test conditions, the number of rotations of driving-side rotation shaft D1 about central axis C1 was set at 2000 rpm, and the value of a load W (see FIG. 5) to be applied to driven-side test specimen F2 was set at 230 kgf. In this case, load W means the load that is to be applied by driven-side rotation shaft F1 to driven-side test specimen F2 in the direction shown by an arrow W in FIG. 5, that is, in the direction approaching driving-side rotation shaft D1, during rotation of driving-side rotation shaft D1. As driving-side rotation shaft D1 rotates about central axis C1 by motor M, driven-side rotation shaft F1 rotates about central axis C2 in the direction opposite to the direction in which driving-side rotation shaft D1 rotates. This is because driving-side test specimen D2 and driven-side test specimen F2 are in contact with each other.

The test time period was set at 100 minutes. The test was ended at the time when the total number of times that the load was applied to driven-side test specimen F2 amounted to 200,000. The above-described condition was defined as the condition on which micro exfoliation referred to as peeling is more likely to occur on the surface of the rolling part of driven-side test specimen F2.

The following is an explanation with reference to Tables 2 and 3 about the shapes, dimensions and the like of driving-side test specimen D2 and driven-side test specimen F2 used in each of three types of tests. The three types of tests herein means Comparative Example conducted as a nonstandard test in the present embodiment, Test Example 1 conducted as a test based on the present embodiment, and Test Example 2 conducted as a modification different from Test Example 1 of the test conducted based on the present embodiment. First, referring to Table 2, the conditions such as dimensions and the like of driving-side test specimen D2 used in each of three types of tests will be hereinafter described.

As shown in Table 2, driving-side test specimen D2 is formed in a cylindrical shape having a circle when driving-side rotation shaft D1 having driving-side test specimen D2 placed thereon is seen in a plan view from its leading end. The cylindrical shape has an outer diameter of 40 mm that is the same in each of three types of tests including Comparative Example, Test Example 1 and Test Example 2, and has an inner diameter of 20 mm in each of the above-mentioned three types of tests. Also in the following, in each of the above-mentioned three types of tests, the width corresponding to the axial dimension is 12 mm, and the axial sub-radius of curvature is 60 mm.

Driving-side test specimen D2 is made of SUJ2 defined by JIS standards in each of the above-mentioned three types of tests. As shown in Table 2, the Rockwell hardness of the end panel (which is an outside surface and corresponds to the surface of the rolling part) of driving-side test specimen D2 in each of Comparative Example and Test Example 1 is 62.2 HRC, which was obtained by performing the following process. After the steel material of SUJ2 was first held at 840° C. for 40 minutes, the steel material was introduced into oil of 80° C. and then cooled, thereby being quenched. The resultant product was then heated to 180° C. and then tempered for 3 hours. Also as shown in Table 2, the Rockwell hardness of the end panel of driving-side test specimen D2 in Test Example 2 is 60.5 HRC, which was obtained by performing the following process. After the steel material of SUJ2 was first held at 850° C. for 80 minutes, the steel material was introduced into oil of 80° C. and then cooled, thereby being quenched. The resultant product was then heated to 220° C. and then tempered for 100 hours.

Then, test specimen D2 in each of Comparative Example, Test Example 1 and Test Example 2 was finished such that the value of an axial arithmetic mean roughness Ra of the circular outside surface in a plan view of driving-side test specimen D2 was 0.650 μM, and the value of an axial root mean square slope RΔq of the circular outside surface of driving-side test specimen D2 was 0.270. The outside surface of driving-side test specimen D2 corresponds to the surface of the rolling part of driving-side test specimen D2.

In Comparative Example, the process of coating with triiron tetraoxide was not performed after quenching and tempering of the outside surface of driving-side test specimen D2. In contrast, driving-side test specimen D2 in each of Test Example 1 and Test Example 2 was subjected to the process of coating with triiron tetraoxide after quenching and tempering of its outside surface. Specifically, after quenching and tempering, polishing was performed such that the arithmetic mean roughness of the outside surface of driving-side test specimen D2 had the same value as that in

TABLE 2

| Driving-Side Test Specimen D2 | Comparative Example | Test Example 1 | Test Example 2 |
|---|---|---|---|
| Dimensions | Outer Diameter: φ40 mm, Inner Diameter: φ20 mm, Width: 12 mm, Axial Sub-Radius of Curvature R: 60 mm | | |
| Steel Material | SUJ2 | | |
| Rockwell Hardness of End Panel | 62.2 HRC | 62.2 HRC | 60.5 HRC |
| Arithmetic Mean Roughness Ra | 0.650 μm | | |
| Root Mean Square Slope RΔq | 0.270 | | |
| Process of Coating with Triiron tetraoxide | None | Done | |

Comparative Example. Then, driving-side test specimen D2 was subjected to the process of coating with triiron tetraoxide. Specifically, driving-side test specimen D2 was immersed for 30 minutes in an alkaline solution containing sodium hydroxide as a main component and heated to 140±5° C. There was almost no change in arithmetic mean roughness and the like of the outside surface of driving-side test specimen D2 before and after this coating process.

Then, the conditions such as dimensions and the like for driven-side test specimen F2 used in each of the three types of tests will be described with reference to Table 3.

TABLE 3

| Driven-Side Test Specimen F2 | Comparative Example | Test Example 1 | Test Example 2 |
|---|---|---|---|
| Dimensions | Outer Diameter: φ40 mm, Inner Diameter: φ20 mm, Width: 12 mm, Axial Sub-Radius of Curvature: None | | |
| Steel Material | SUJ2 | | |
| Rockwell Hardness of End Panel | 62.2 HRC | 62.2 HRC | 63.0 HRC |
| Arithmetic Mean Roughness Ra | 0.020 μm | 0.200 μm | 0.070 μm |
| Root Mean Square Slope RΔq | 0.013 | 0.100 | 0.074 |
| Process of Coating with Triiron tetraoxide | None | Done | |

As shown in Table 3, driven-side test specimen F2 is formed in a cylindrical shape having a circle when driven-side rotation shaft F1 having this driven-side test specimen F2 placed thereon is seen in a plan view from its leading end. In each of the above-described three types of tests, driven-side test specimen F2 has an outer diameter of 40 mm, an inner diameter of 20 mm, and a width corresponding to the axial dimension of 12 mm, but no axial sub-radius of curvature.

In each of the above-mentioned three types of tests, driven-side test specimen F2 is made of SUJ2 defined by JIS standards. As shown in Table 3, the Rockwell hardness of the end panel of driven-side test specimen F2 in each of Comparative Example and Test Example 1 is 62.2 HRC, which was obtained by performing the following process. After the steel material of SUJ2 was first held at 840° C. for 40 minutes, the steel material was introduced into oil of 80° C. and then cooled, thereby being quenched. The resultant product was then heated to 180° C. and then tempered for 3 hours. Also as shown in Table 3, the Rockwell hardness of the end panel of driven-side test specimen F2 in Test Example 2 is 63.0 HRC, which was obtained by performing the following process. After the steel material of SUJ2 was first held at 850° C. for 80 minutes, the steel material was introduced into oil of 80° C. and then cooled, thereby being quenched. The resultant product was then heated to 180° C. and then tempered for 4 hours.

After tempering, the test specimen in Comparative Example was polished and super-finished so as to be finished such that arithmetic mean roughness Ra of the outside surface was 0.020 μm, and root mean square slope RΔq of the outside surface was 0.013. Also in Test Example 1, after quenching and tempering, the outside surface of driven-side test specimen F2 was polished so as to be finished such that arithmetic mean roughness Ra of the outside surface was 0.200 μm and root mean square slope RΔq of the outside surface was 0.100. Also in Test Example 2, after quenching and tempering, the outside surface of driven-side test specimen F2 was polished and super-finished so as to be finished such that arithmetic mean roughness Ra of the outside surface was 0.070 μm and root mean square slope RΔq of the outside surface was 0.074. The outside surface of driven-side test specimen F2 corresponds to the surface of the rolling part of driven-side test specimen F2.

FIGS. 6(A) and 6(B) show enlarged microscope photographs each showing the planar shape of the outside surface that is a rolling part of driven-side test specimen F2 corresponding to the second rolling component, which are taken after conducting the tests in Comparative Example and each Test Example, respectively, using each of the above-described test specimens. Referring to FIGS. 6(A) and 6(B), much peeling occurred on the surface of the rolling part of driven-side test specimen F2 in Comparative Example, whereas no peeling occurred on the surface of the rolling part of driven-side test specimen F2 in each of Test Example 1 and Test Example 2.

Table 4 shows the measurement results of axial root mean square slope RΔq of the rolling part of driving-side test specimen D2 corresponding to the first rolling component, which are obtained after conducting the test in each of Comparative Example and each Test Example using each of the above-described test specimens.

TABLE 4

| Test Specimen | Standard Product | Test Example 1 | Test Example 2 |
|---|---|---|---|
| Root Mean Square Slope RΔq | 0.215 | 0.078 | 0.078 |

As shown in Table 4, the value of root mean square slope RΔq was smaller in driving-side test specimen D2 in each of Test Example 1 and Test Example 2 than in driving-side test specimen D2 in Comparative Example.

Furthermore, FIG. 7 shows the results of having measured the three-dimensional shape using a laser microscope for the outside surface that is a rolling part of driving-side test specimen D2 corresponding to the first rolling component, which are obtained after conducting the test in each of Comparative Example and each Test Example using each of the above-described test specimens. Referring to FIG. 7, it could be confirmed that micro protrusions on the rolling part are more roundish in Test Examples 1 and 2 than in Comparative Example.

From these results, the following finding was obtained. Specifically, driving-side test specimen D2 with the rolling part having a larger value of the surface roughness was subjected to a process of coating with triiron tetraoxide. Also, driven-side test specimen F2 with the rolling part having a smaller value of the surface roughness was prepared to have axial arithmetic mean roughness Ra of 0.07 µm or more and 0.20 µm or less. Then, by applying the combination of such test specimens, the slope of each roughness protrusion on the rolling part of driving-side test specimen D2 was reduced, so that peeling could be suppressed.

Example 2

Particularly in Example 2, the test focused on the hardness condition for the rolling part of each of the first and second rolling components was conducted.

Also in the present Example, two disk fatigue tester 2 shown in FIG. 5 was used as in Example 1. The following is an explanation with reference to Table 5 about: the conditions for the shape and the dimensions of each of driving-side test specimen D2 and driven-side test specimen F2 in the present Example; and the driving conditions for the equipment of two disk fatigue tester 2.

such that the axial surface roughness of the circular outside surface in a plan view of driven-side test specimen F2 was the same in each of Test Examples, the value of arithmetic mean roughness Ra was about 0.020 µm, and the value of root mean square slope R$\Delta$q was about 0.013. The value of the surface roughness was the same as that in Comparative Example in Table 3 and FIG. 6(A), which was defined as a condition that peeling (micro exfoliation) is more likely to occur on the surface of the rolling part of driven-side test specimen F2.

The driving conditions for the equipment of two disk fatigue tester 2 (lubricating oil, number of rotations, load, test time period, number of times of load to be applied) are as shown in Table 5. Specifically, the test time period was set at 5 minutes, and the test was ended at the time when the total number of times that the load was applied to driven-side test specimen F2 amounted to 10,000. The conditions other than the above were the same as those in Example 1.

TABLE 5

| | |
|---|---|
| Driving-Side Test Specimen D2 | Outer Diameter: φ 40 mm, Inner Diameter: φ20 mm, Width: 12 mm, Axial Sub-Radius of Curvature R: 60 mm |
| Axial Surface Roughness of D2 | Ra: 0.650 µm, R$\Delta$q: 0.270 |
| Driven-Side Test Specimen F2 | Outer Diameter: φ40 mm, Inner Diameter: φ20 mm, Width: 12 mm, Axial Sub-Radius of Curvature R: None |
| Axial Surface Roughness of F2 | Ra: 0.020 µm, R$\Delta$q: 0.013 |
| Lubricating Oil | Additive-Free Poly-α-Olefin Oil (equivalent to VG5) |
| Number of Rotations | 2000 rpm |
| Load | 230 kgf |
| Test Time Period | 5 min |
| Number of Times of Load to be Applied | 10,000 |

As shown in Table 5, driving-side test specimen D2 is formed in a cylindrical shape having the same dimensions in each of Test Examples performed in the present Example, and having an outer diameter of 40 mm, an inner diameter of 20 mm, a width corresponding to the axial dimension of 12 mm, and a sub-radius of curvature in the width direction of 60 mm. Also, polishing was conducted such that the axial surface roughness of the circular outside surface in a plan view of driving-side test specimen D2 was the same in each of Test Examples, and that the value of arithmetic mean roughness Ra was about 0.650 µm and the value of root mean square slope R$\Delta$q was about 0.270.

Also as shown in Table 5, driven-side test specimen F2 is formed in a cylindrical shape having the same dimensions in each of Test Examples performed in the present Example, and having an outer diameter of 40 mm, an inner diameter of 20 mm, and a width corresponding to the axial dimension of 12 mm, but no sub-radius of curvature in the width direction. Polishing and super-finishing were conducted Also, in the present Example, the manner of fixing driving-side test specimen D2 and driven-side test specimen F2 to two disk fatigue tester 2, and the manner of rotating driving-side test specimen D2 and driven-side test specimen F2 are the same as those in Example 1, which can be explained with reference to FIG. 5, and therefore, detailed explanation thereof will not be given.

The following is an explanation with reference to FIG. 6 about: the treatment conditions for driving-side test specimen D2 and driven-side test specimen F2 used in each of nine types of tests in the present Example; and the hardness and the like finally obtained by the treatment. Unlike Example 1, in the present Example, nine types of tests are shown as Test Examples 3 to 11, irrespective of whether the test was based on the present embodiment or the test was nonstandard in the present embodiment.

TABLE 6

| Test Specimen | Test Example 3 | Test Example 4 | Test Example 5 | Test Example 6 | Test Example 7 | Test Example 8 | Test Example 9 | Test Example 10 | Test Example 11 |
|---|---|---|---|---|---|---|---|---|---|
| Steel Material | SUJ2 | | | | | | | | |
| Method of Quenching D2 and F2 | Soaked at 850° C. for 80 minutes and thereafter cooled in oil of 80° C. | | | | | | | | |
| Tempering Temperature of D2 | 250° C. | | | 230° C. | | | 200° C. | | |
| Tempering Time Period of D2 | 7.5 h | | | 7.5 h | | | 3 h | | |

TABLE 6-continued

| Test Specimen | Test Example 3 | Test Example 4 | Test Example 5 | Test Example 6 | Test Example 7 | Test Example 8 | Test Example 9 | Test Example 10 | Test Example 11 |
|---|---|---|---|---|---|---|---|---|---|
| Tempering Temperature of F2 | 250° C. | 230° C. | 200° C. | 250° C. | 230° C. | 200° C. | 250° C | 230° C | 200° C. |
| Tempering Time Period of F2 | 7.5 h | 7.5 h | 3 h | 7.5 h | 7.5 h | 3 h | 7.5 h | 7.5 h | 3 h |
| Rockwell Hardness of Panel Width of D2 | 59.7 | 59.6 | 59.5 | 60.7 | 60.5 | 60.5 | 61.6 | 61.5 | 61.4 |
| Rockwell Hardness of End Panel of F2 | 59.7 | 60.5 | 61.5 | 59.7 | 60.5 | 61.5 | 59.7 | 60.4 | 61.4 |
| Hardness Difference (Hardness of End Panel of F2 − Hardness of End Panel of D2) | 0 | 0.9 | 2 | −1 | 0 | 1 | −1.9 | −1.1 | 0 |

As shown in Table 6, the steel material forming each of driving-side test specimen D2 and driven-side test specimen F2 is SUJ2 defined by JIS standards in each of Test Examples 3 to 11. Furthermore, in each of all Test Examples, driving-side test specimen D2 and driven-side test specimen F2 were soaked at 850° C. for 80 minutes, and thereafter introduced into oil of 80° C. and cooled therein, thereby being quenched.

However, the conditions for subsequent tempering are different for each Test Example and each test specimen. Specifically, driving-side test specimen D2 in each of Test Examples 3 to 5 was tempered at 250° C. for 7.5 hours, driving-side test specimen D2 in each of Test Examples 6 to 8 was tempered at 230° C. for 7.5 hours, and driving-side test specimen D2 in each of Test Examples 9 to 11 was tempered at 200° C. for 3 hours. Also, driven-side test specimen F2 in each of Test Examples 3, 6 and 9 was tempered at 250° C. for 7.5 hours, driven-side test specimen F2 in each of Test Examples 4, 7, and 10 was tempered at 230° C. for 7.5 hours, and driven-side test specimen F2 in each of Test Examples 5, 8, and 11 was tempered at 200° C. for 3 hours. On the above-described tempering conditions, the Rockwell hardness of the end panel (corresponding to the surface of the rolling part) of each of driving-side test specimen D2 and driven-side test specimen F2 was measured. The Rockwell hardness was classified substantially into three types of about 59.5 HRC, about 60.5 HRC or about 61.5 HRC (including an error of about ±0.2 HRC). However, Test Examples 3 to 11 were prepared such that the value of the Rockwell hardness of the end panel of driving-side test specimen D2 and the value of the Rockwell hardness of the end panel of driven-side test specimen F2 (based on the above-described classification) were differently combined.

Figure 8:
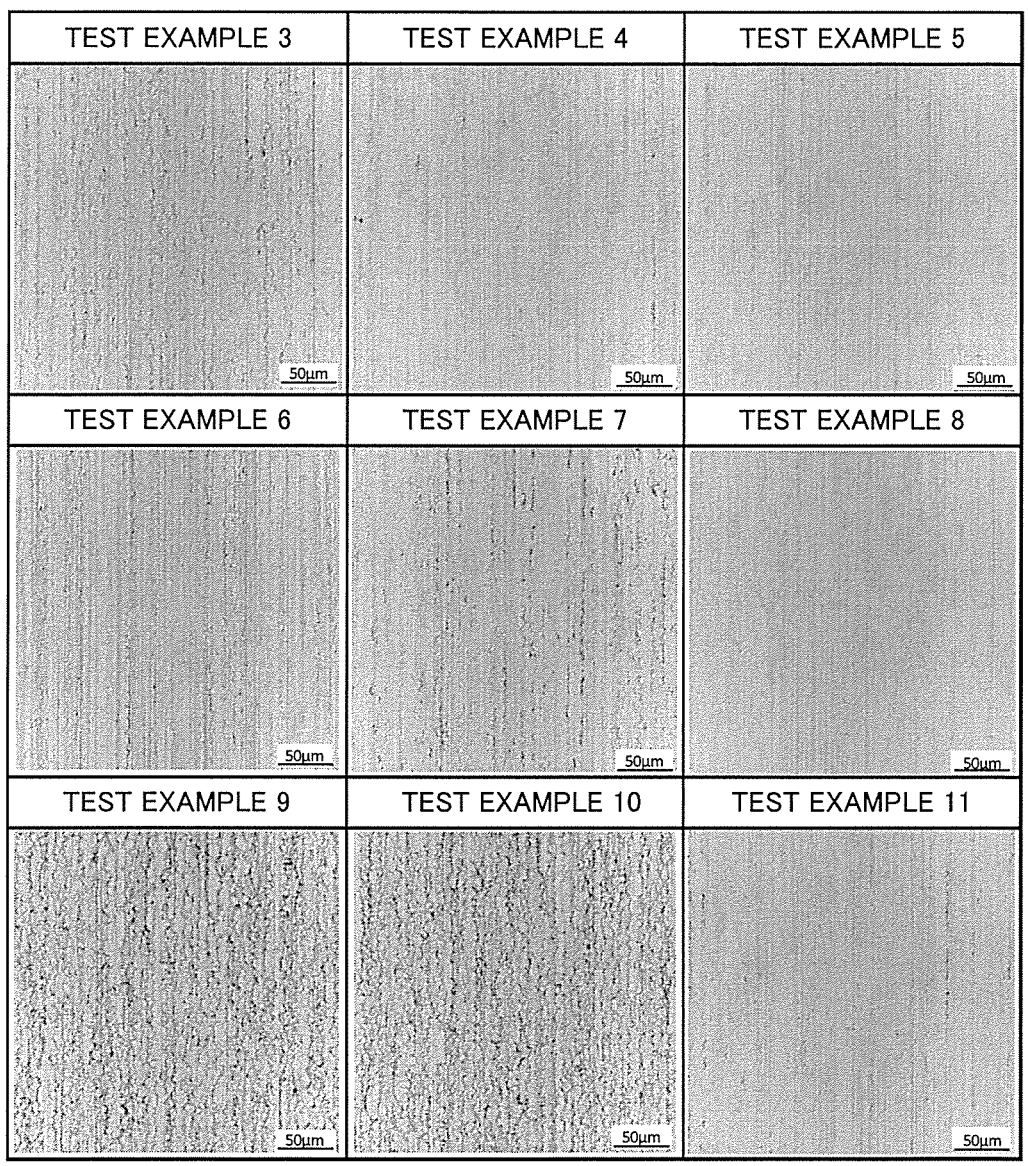
FIG. 8 is an enlarged microscope photograph of the surface of a rolling part as a test specimen on the conditions in each Test Example in Example 2, which is taken after the peeling resistance performance evaluation test.

The peeling resistance performance evaluation test was conducted in each of Test Examples employing nine types of test specimens in different combinations of hardnesses. FIG. 8 shows a portion where cracking occurs in a microphotograph of the outside surface as the rolling part of driven-side test specimen F2 corresponding to the second rolling component, which is obtained after conducting each test, and Table 7 shows an area ratio (%) of the portion where cracking occurs. The area ratio was calculated by monochrome-imaging the photograph in FIG. 8 using commercially-available image processing software in each of Test Examples, and binarization-processing the image so as to completely fill in only each portion where cracking occurred.

TABLE 7

| Test Specimen | Test Example 3 | Test Example 4 | Test Example 5 | Test Example 6 | Test Example 7 | Test Example 8 | Test Example 9 | Test Example 10 | Test Example 11 |
|---|---|---|---|---|---|---|---|---|---|
| Area Ratio (%) of Portion where Cracking Occurs | 5.547 | 0.513 | 0.222 | 5.448 | 4.016 | 0.197 | 20.12 | 19.58 | 1.189 |

Referring to FIG. 8 and Table 7, when driving-side test specimen D2 as the first rolling component is lower in Rockwell hardness (in the unit of HRC) of the end panel than driven-side test specimen F2 as the second rolling component, that is, in Test Examples 4, 5, and 8 in which each hardness difference in Table 6 shows a positive value, the number of occurrences of cracking recognized as an initial stage of peeling is apparently smaller than those in other Test Examples. Also, cracking occurs in each of Test Examples 3, 7, and 11 in which the value of the hardness difference in Table 6 is zero. Among then, the number of occurrences of cracking is smaller in Test Example 11 than in Test Examples 3 and 7. It is considered that this is because the Rockwell hardness of the end panel of driven-side test specimen F2 is 61.4 HRC (about 61.5 HRC) in Test Example 11. In each of Test Examples 5 and 8 described above, the Rockwell hardness of the end panel of driven-side test specimen F2 is 61.5 HRC.

From the above results, it turned out that, when driving-side test specimen D2 with the rolling part having a large surface roughness is relatively lower in hardness than driven-side test specimen F2, fatigue progress on the surface of the rolling part of driven-side test specimen F2 can be suppressed, so that peeling can be suppressed. It also turned out that, in addition to the above-described hardness difference, when the Rockwell hardness of the end panel of driven-side test specimen F2 is 61.5 HRC or more (at least 61.4 HRC or more), the above-described effect of suppressing fatigue progress can be further enhanced.

Example 3

In order to examine the functions and effects by the configuration in each of the third and fourth embodiments as described above, two types of peeling resistance performance evaluation tests were conducted using two types of test specimens. In the following, the details and the results of each test will be described with reference to FIGS. 5 and 12.

In each test in this case, two disk fatigue tester 2 in FIG. 5 was used. The driving conditions for the equipment of two disk fatigue tester 2 are shown in the above-described Table 1. Also in the present Example, two disk fatigue tester 2 is driven in the same manner as in Example 1.

Referring to Tables 8 and 9, an explanation will be hereinafter given with regard to the shapes, the dimensions and the like of each of driving-side test specimen D2 and driven-side test specimen F2 used in each of two types of tests. Two types of tests herein mean Comparative Example as a nonstandard test in the present embodiment, and Test Example as a test based on the present embodiment. First referring to Table 8, the conditions such as dimensions and the like of driving-side test specimen D2 used in each of two types of tests will be described.

TABLE 8

| Driving-Side Test Specimen D2 | Comparative Example | Test Example |
|---|---|---|
| Dimensions | Outer Diameter: φ40 mm, Inner Diameter: φ20 mm, Width: 12 mm, Axial Sub-Radius of Curvature R: 60 mm | |
| Steel Material | SUJ2 | |
| Rockwell Hardness of End Panel | 60.2 HRC | 60.5 HRC |
| Outside Surface: Arithmetic Mean Roughness Ra | 0.650 μm | |
| Outside Surface: Root Mean Square Slope RΔq | 0.270 | |

As shown in Table 8, driving-side test specimen D2 is formed in a cylindrical shape having a circle when driving-side rotation shaft D1 having this driving-side test specimen D2 placed thereon is seen in a plan view from its leading end. The outer diameter is 40 mm, which is the same in each of two types of tests including Comparative Example and Test Example. The inner diameter is 20 mm in each of the above-described two types of tests. Also in the following, in each of the above-described two types of tests, the width corresponding to the axial dimension is 12 mm, and the axial sub-radius of curvature is 60 mm.

The test specimen was made of SUJ2 defined by JIS standards in each of the above-described two types of tests. Each of these test specimens was subjected to a typical quenching treatment and thereafter subjected to a tempering treatment, so as to be processed such that the Rockwell hardness of the end panel was 62.2 HRC in Comparative Example, and that the Rockwell hardness of the end panel was 60.5 HRC in Test Example. Then, in each of the above-described two types of tests, polishing was conducted such that the value of axial arithmetic mean roughness Ra of the circular outside surface in a plan view of driving-side test specimen D2 was 0.650 μm, and that the value of axial root mean square slope RΔq of the circular outside surface of driving-side test specimen D2 was 0.270.

Then, referring to Table 9, the conditions such as dimensions and the like of driven-side test specimen F2 used in each of two types of tests will be hereinafter described.

TABLE 9

| Driven-Side Test Specimen F2 | Comparative Example | Test Example |
|---|---|---|
| Dimensions | Outer Diameter: φ40 mm, Inner Diameter: φ20 mm, Width: 12 mm, Axial Sub-Radius of Curvature R: None | |
| Steel Material | SUJ2 | |
| Rockwell Hardness of End Panel | 62.2 HRC | 63.0 HRC |
| Outside Surface: Arithmetic Mean Roughness Ra | 0.020 μm | 0.070 μm |
| Outside Surface: Root Mean Square Slope RΔq | 0.013 | 0.074 |

As shown in Table 9, driven-side test specimen F2 is formed in a cylindrical shape having a circle when driven-side rotation shaft F1 having driven-side test specimen F2 placed thereon is seen in a plan view from its leading end. In each of the above-described two types of tests, driven-side test specimen F2 is formed to have an outer diameter of 40 mm, an inner diameter of 20 mm, and a width corresponding to the axial dimension of 12 mm, but no axial sub-radius of curvature.

In each of the above-described two types of tests, the test specimen was made of SUJ2 defined by JIS standards, and was quenched and thereafter tempered, so as to be processed such that the Rockwell hardness of the end panel was 62.2 HRC in Comparative Example, and that the Rockwell hardness of the end panel was 63.0 HRC in Test Example. In each of the above-described two types of tests, driven-side test specimen F2 was tempered, and thereafter polished and super-finished. Thereby, in Comparative Example, driven-side test specimen F2 was finished such that arithmetic mean roughness Ra of the outside surface was 0.020 μm and root mean square slope RΔq of the outside surface was 0.013. Also in Test Example, driven-side test specimen F2 was finished such that arithmetic mean roughness Ra of the outside surface was 0.070 μm and root mean square slope RΔq of the outside surface was 0.074.

In addition, driving-side test specimen D2 and driven-side test specimen F2 in Comparative Example each have a Rockwell hardness of the end panel set at 62.2 HRC, which was obtained by performing the following steps. After the steel material was held at 840° C. for 40 minute, the steel material was cooled in oil of 80° C. and thereby quenched, and thereafter tempered at 180° C. for 3 hours. The Rockwell hardness of the end panel of driving-side test specimen D2 in Test Example is 60.5 HRC, which was obtained by performing the following steps. After the steel material was first held at 850° C. for 80 minute, the steel material was cooled in oil of 80° C. and thereby quenched, and thereafter tempered at 220° C. for 100 hours. The Rockwell hardness of the end panel of driven-side test specimen F2 in Test Example is 63.0 HRC, which was obtained by performing the following steps. After the steel material was first held at 850° C. for 80 minute, the steel material was cooled in oil of 80° C. and thereby quenched, and thereafter tempered at 180° C. for 4 hours.

Figure 12:
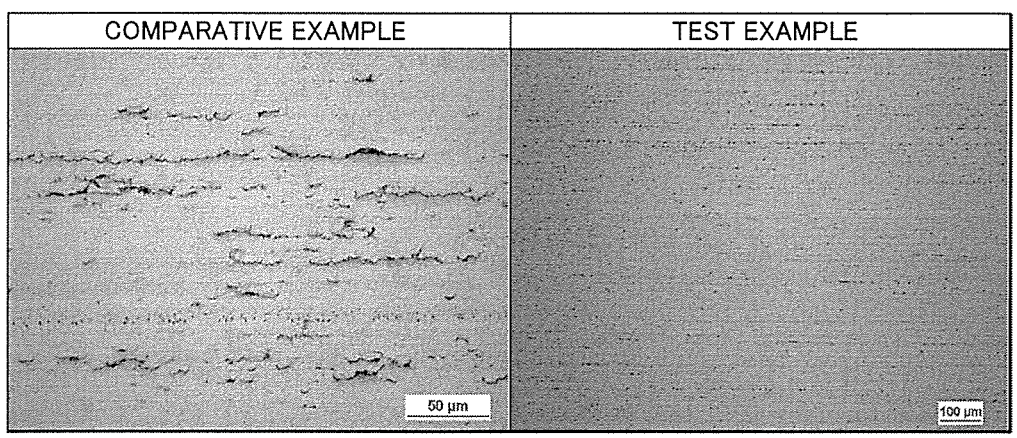
FIG. 12 is an enlarged microscope photograph of the surface of the rolling part as a test specimen on the conditions in Comparative Example in the present embodiment, which is taken after the peeling resistance performance evaluation test, and an enlarged microscope photograph of the surface of the rolling part as a test specimen on the conditions in Example of the present embodiment, which is taken after the peeling resistance performance evaluation test.

FIG. 12 shows an enlarged microscope photograph of the planar shape of the outside surface that is the rolling part of driven-side test specimen F2 corresponding to the second rolling component, which is obtained after conducting each test of Comparative Example and Test Example using each of the above-described test specimens. Referring to FIG. 12, much peeling occurred on the surface of the rolling part of driven-side test specimen F2 in Comparative Example, whereas no peeling occurred on the surface of the rolling part of driven-side test specimen F2 in Test Example.

Table 10 shows the measurement results of axial root mean square slope RΔq of the rolling part of driving-side test specimen D2 corresponding to the first rolling component, which is obtained after conducting the test in each of Comparative Example and Test Example using each of the above-described test specimens.

TABLE 10

| Test Specimen | Comparative Example | Test Example |
|---|---|---|
| Root Mean Square Slope RΔq | 0.215 | 0.181 |

As shown in Table 10, the value of root mean square slope RΔq was smaller in driving-side test specimen D2 in Test Example than in driving-side test specimen D2 in Comparative Example.

Based on this result, it can be recognized as preferable that: the rolling part of driving-side test specimen D2 is greater in surface roughness than the rolling part of driven-side test specimen F2; the surface of the rolling part of driving-side test specimen D2 is softer in hardness than the surface of the rolling part of driven-side test specimen F2; the arithmetic mean roughness of the surface of the rolling part before the test of driving-side test specimen D2 is about 0.070 μm; and the root mean square slope is approximately 0.074. It turned out that, by applying such a combination of the test specimens, running-in in the rolling part is facilitated during the test of driving-side test specimen D2, to thereby smooth the slope of each roughness protrusion on the surface of the rolling part of driving-side test specimen D2, so that peeling can be suppressed.

It should be understood that each embodiment and example disclosed herein are illustrative and non-restrictive in every respect. The scope of the present invention is defined by the terms of the claims, rather than the description above, and is intended to include any modifications within the meaning and scope equivalent to the terms of the claims.

REFERENCE SIGNS LIST 1 deep groove ball bearing, 2 two disk fatigue tester, 3 oil-feeding felt pad, 11, 120, 130 outer ring, 11A, 120A, 130A outer ring raceway surface, 11B, 12B film, 12, 121, 131 inner ring, 12A, 121A, 131A inner ring raceway surface, 13 ball, 13A ball rolling surface, 14, 123, 133 cage, 102 tapered roller bearing, 103 cylindrical roller bearing, 122, 132 roller, 122A, 132A roller rolling surface, D1 driving-side rotation shaft, D2 driving-side test specimen, DF outside surface contact portion, F1 driven-side rotation shaft, F2 driven-side test specimen.

The invention claimed is:

1. A rolling device comprising:
a first rolling component made of high carbon chromium bearing steel; and
a second rolling component made of high carbon chromium bearing steel and configured to contact the first rolling component,
wherein a surface of a rolling part of the first rolling component is greater in arithmetic mean roughness than a surface of a rolling part of the second rolling component, and the arithmetic mean roughness of the surface of the rolling part of the first rolling component is 0.70 μm or less,
wherein the arithmetic mean roughness of the surface of the rolling part of the second rolling component is 0.07 μm or more and 0.20 μm or less, and a root mean square slope of the surface of the rolling part of the second rolling component being 0.074 or more and 0.100 or less,
wherein the rolling part of the first rolling component is lower in Rockwell hardness than the rolling part of the second rolling component, and the Rockwell hardness of the rolling part of the second rolling component being 61.5 HRC or more,
wherein a film containing at least one of an iron oxide or an iron compound is provided on the surface of the rolling part of the first rolling component, and wherein a value of an oil film parameter in a region between the first rolling component and the second rolling component is 1.2 or less.

2. The rolling device according to claim 1, wherein the film contains a triiron tetraoxide.

3. A rolling bearing as the rolling device according to claim 1, the rolling bearing comprising:
a plurality of rolling elements;
an outer ring having an outer ring raceway surface on an inner circumferential surface of the outer ring, the outer ring being disposed on an outside of the plurality of rolling elements so as to contact the plurality of rolling elements; and
an inner ring having an inner ring raceway surface on an outer circumferential surface of the inner ring, the inner ring being disposed on an inside of the plurality of rolling elements so as to contact the plurality of rolling elements,
the outer ring and the inner ring serving as the first rolling component, and the plurality of rolling elements serving as the second rolling component.

4. A rolling device comprising:
a first rolling component made of high carbon chromium bearing steel; and
a second rolling component made of high carbon chromium bearing steel and configured to contact the first rolling component,
wherein a surface of a rolling part of the first rolling component is lower in Rockwell hardness than a surface of a rolling part of the second rolling component,
wherein the surface of the rolling part of the first rolling component is greater in arithmetic mean roughness than the surface of the rolling part of the second rolling component,
wherein the arithmetic mean roughness of the surface of the rolling part of the second rolling component is 0.07 µm or more and 0.10 µm or less, and a root mean square slope of the surface of the rolling part of the second rolling component being 0.07 or more and 0.10 or less, and
wherein a value of an oil film parameter in a region between the first rolling component and the second rolling component is 1.2 or less.

5. The rolling device according to claim 4, wherein the Rockwell hardness of the surface of the rolling part of the first rolling component is lower, by 0.5 HRC or more, than the Rockwell hardness of the surface of the rolling part of the second rolling component.

6. A rolling bearing as the rolling device according to claim 4, the rolling bearing comprising:
a plurality of rolling elements;
an outer ring having an outer ring raceway surface on an inner circumferential surface of the outer ring, the outer ring being disposed on an outside of the plurality of rolling elements so as to contact the plurality of rolling elements; and
an inner ring having an inner ring raceway surface on an outer circumferential surface of the inner ring, the inner ring being disposed on an inside of the plurality of rolling elements so as to contact the plurality of rolling elements,
the outer ring and the inner ring serving as the first rolling component, and the plurality of rolling elements serving as the second rolling component.

* * * * *